US010042833B2

(12) United States Patent
Scheers et al.

(10) Patent No.: US 10,042,833 B2
(45) Date of Patent: Aug. 7, 2018

(54) OPTIMIZING THE PLACEMENT OF CLUSTERED TEXTURAL ANNOTATIONS

(71) Applicant: Landmark Graphics Corporation, Houston, TX (US)

(72) Inventors: Margaret O'Brien Scheers, Houston, TX (US); Jeanne Udall, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 335 days.

(21) Appl. No.: 14/776,219

(22) PCT Filed: Apr. 29, 2013

(86) PCT No.: PCT/US2013/038602
§ 371 (c)(1),
(2) Date: Sep. 14, 2015

(87) PCT Pub. No.: WO2014/178816
PCT Pub. Date: Nov. 6, 2014

(65) Prior Publication Data
US 2016/0034439 A1    Feb. 4, 2016

(51) Int. Cl.
*G06F 17/21*  (2006.01)
*G06F 17/24*  (2006.01)
*G06T 11/60*  (2006.01)

(52) U.S. Cl.
CPC .......... *G06F 17/241* (2013.01); *G06F 17/211* (2013.01); *G06F 17/212* (2013.01); *G06F 17/214* (2013.01); *G06T 11/60* (2013.01)

(58) Field of Classification Search
CPC .... G06F 17/241; G06F 17/211; G06F 17/212; G06F 17/214; G06T 11/60
(Continued)

(56) References Cited

U.S. PATENT DOCUMENTS

2006/0005849 A1    1/2006   Thomas-Dupree
2006/0044619 A1    3/2006   Namiki et al.
(Continued)

FOREIGN PATENT DOCUMENTS

EP         0965925 A2    12/1999

OTHER PUBLICATIONS

"Carlson Survey 2008 Standalone"; Carlson Software Inc.; <http://files.carlsonsw.com/mirror/manuals/Carlson_Survey_2008_Standalone.pdf>; Published Aug. 17, 2007.*

(Continued)

*Primary Examiner* — Stephen S Hong
*Assistant Examiner* — Broderick C Anderson
(74) *Attorney, Agent, or Firm* — Howard L. Speight, PLLC.

(57) ABSTRACT

A processor receives a command to optimize the placement of a plurality of annotations along a polyline displayed on a graphical user interface. The plurality of annotations has a plurality of font sizes and each font size has a height. A plurality of annotation slot size candidates is selected for logical annotation slots along the polyline. An annotation slot size is selected from among the plurality of annotation slot size candidates, wherein the chosen annotation slot size is smaller than largest of the font sizes. The polyline is divided into logical annotation slots having the chosen annotation slot size. The plurality of annotations is distributed among the logical annotation slots. The polyline and the distributed plurality of annotations is displayed on the graphical user interface.

20 Claims, 18 Drawing Sheets

(58) Field of Classification Search
USPC .......................................................... 715/232
See application file for complete search history.

(56) References Cited

U.S. PATENT DOCUMENTS

2006/0058949 A1  3/2006  Fogel et al.
2007/0089051 A1  4/2007  Madan

OTHER PUBLICATIONS

International Preliminary Examining Authority, Patent Cooperation Treaty, International Preliminary Report on Patentability, International Application No. PCT/US13/38602, which is a PCT parent to the instant application, dated Sep. 1, 2015.

International Searching Authority, International Search Report and Written Opinion, International Application No. PCT/US2013/038602, which is a PCT parent to the instant application, dated Oct. 4, 2013.

Stadler et al, A Practical Map Labeling Algorithm Utilizing Image Processing and Forced-Directed Method, Cartography and Geographic Information Science, vol. 33,2006. Retrieved on [Sep. 24, 2013]. Retrieved from the internet <URL: http:www.geometrie.tuwien.ac.at/ig/papers/tr137.pdf> entire document filed herewith.

Australian Government IP Australia, Patent Examination Report No. 2, Patent Application No. 2013388122, entire document, which is an AU counterpart to the instant application, dated Nov. 10, 2016.

Carlson Software Inc., Carlson Survey 2008 Standalone, User manual, XP-002761158, Aug. 17, 2007, Entire Document, which is an EP counterpart to the instant application.

European Patent Office, European Search Report, Application No./Patent No. 13883454.4-1507 / 2951724 PCT/US2013038602, entire document, which is an EP counterpart to the instant application, dated Sep. 9, 2016.

Australian Government IP Australia, Patent Examination Report No. 1, Application No. 2013388122, which is an AU counterpart to the instant application, dated Apr. 19, 2016.

Canadian Intellectual Property Office, The Examiner's Letter, Application No. 2,906,324, which is a CA counterpart to the instant application, Jun. 21, 2016.

Intellectual Property Office of Singapore, Written Opinion, Application No. 11201506562W, which is a SG counterpart to the instant application, dated May 11, 2016.

Carlson Software Inc., Carlson Software 2009 User's Manual, Oct. 10, 2008, Entire Document, which was issued an AU counterpart to the instant application, which was access at http://files.carlsonsw.com/mirror/manuals/Carlson2009.pdf on Nov. 21, 2017.

* cited by examiner

Before

| Record | Label | Slot |
|--------|-------|------|
| 0 | 0 | 3 |
| 1 | 0 | 3 |
| 2 | 1 | 3 |
| 3 | 2 | 4 |
| 4 | 3 | 5 |
| 5 | 4 | 5 |
| 6 | 4 | 5 |
| 7 | 5 | 6 |
| 8 | 6 | 8 |
| 9 | 7 | 8 |
| 10 | 8 | 9 |

After

| Record | Label | Slot |
|--------|-------|------|
| 0 | 0 | 0 |
| 1 | 0 | 1 |
| 2 | 1 | 2 |
| 3 | 2 | 3 |
| 4 | 3 | 4 |
| 5 | 4 | 5 |
| 6 | 4 | 6 |
| 7 | 5 | 7 |
| 8 | 6 | 8 |
| 9 | 7 | 9 |
| 10 | 8 | 10 |

OPTIMIZING THE PLACEMENT OF CLUSTERED TEXTURAL ANNOTATIONS

BACKGROUND

It is desirable when annotating data in a two dimensional spatial context, such as a display on a computer monitor, that the placement of the annotations be as close as possible to the data which it is annotating. However, when there are multiple pieces of data close together their annotations may overlap, an occurrence called "overposting." Minimizing overposting while keeping annotations close to the data to which they refer is a challenge.

BRIEF DESCRIPTION OF THE DRAWINGS

FIG. 10 shows a table of logical slot records, before and after application of the techniques described in this application.
FIGS. 18 and 19 shows applications of the techniques described herein in the oil industry.

DETAILED DESCRIPTION

Figure 1:
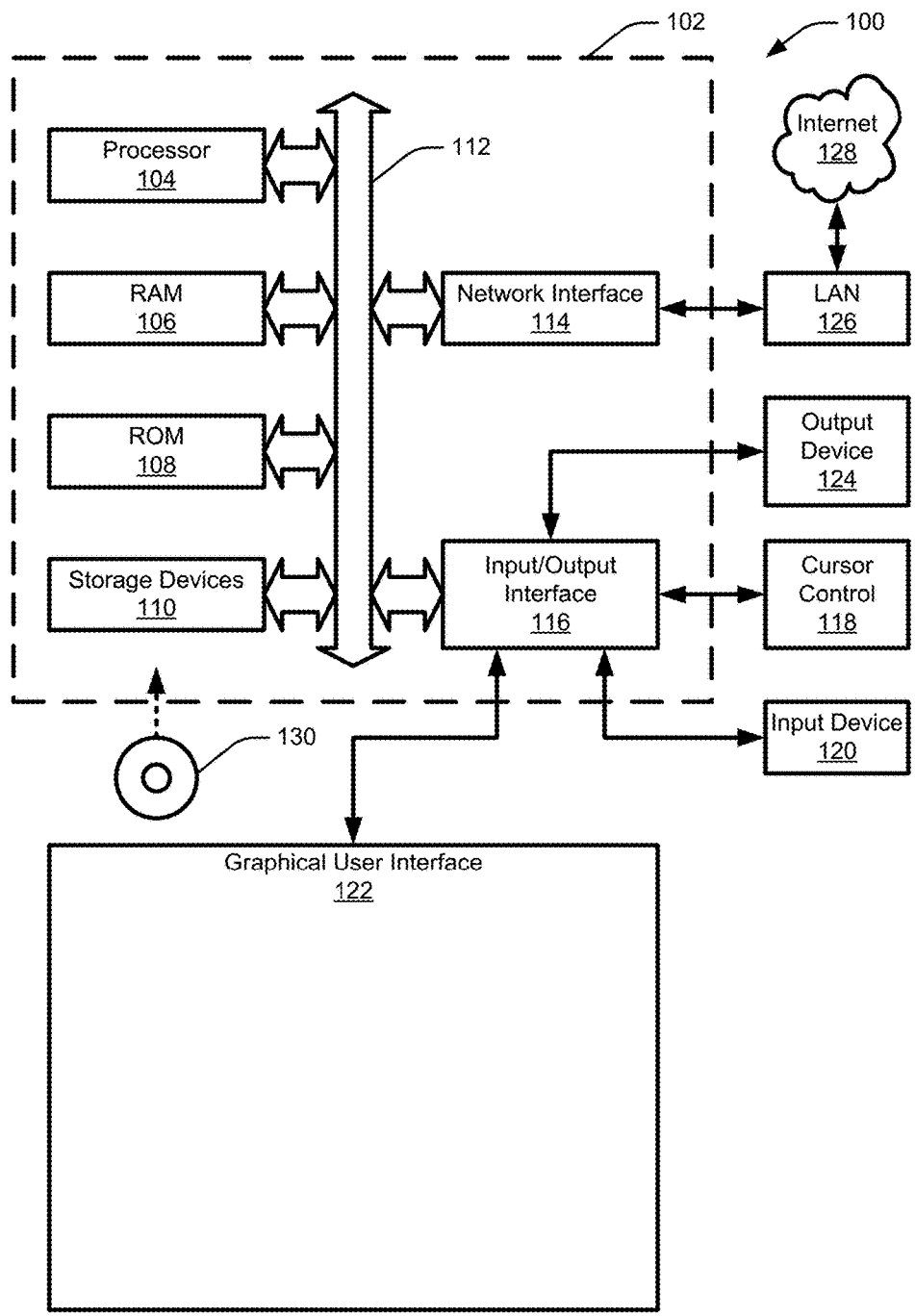
FIG. 1 shows a computer system.

A technique for reducing overposting of clustered annotations drawn in multiple fonts next to a polyline is described herein. In one embodiment, the technique reduces overposting for annotations in multiple distinct fonts. Further, in one embodiment, the technique relocates multiple annotation strings.

Definitions

Polyline: an ordered list of one or more contiguous line segments. For example, a polyline could be used to represent a well bore.

Head: the first point on the polyline.

Tail: the last point on the polyline.

Annotation: text which has a defined location relative to the polyline.

Label: an alternate term for an annotation.

Depth along a polyline: the distance to a location on the polyline from the head of the polyline calculated by summing the constituent line segments between the head of the polyline and the given location.

Section of a polyline: a segment of a polyline between two points selected on the polyline. Each of these points will have a particular depth along the polyline.

Top depth: on a section of a polyline the depth of a point which is nearest to the head of the polyline.

Bottom depth: on a section of a polyline the depth of a point which is nearest to the tail of the polyline.

Annotation location: the location in depth along the polyline with which an annotation string is associated.

Label index: the ordinal of the annotation location given that the annotation locations are ordered from the head to the tail of the polyline.

Next label: the adjacent label that is closer to the tail of the polyline.

Previous label: the adjacent label that is closer to the head of the polyline.

Record index: the ordinal of the annotation location given that the annotation locations are ordered from the head to the tail of the polyline.

Logical annotation slot (or "slot"): a section of the polyline that could hold an annotation. It has a slot height which is measured along the polyline. It may not actually have an annotation in it. Logical annotation slots are ordered from the head of the polyline to the tail of the polyline.

Logical annotation slot index (or "slot index" or "slot number"): an ordinal of a logical annotation slot, ordered from the head of the polyline to the tail of the polyline.

Logical annotation slot location: the slot or slots with which an annotation is associated.

Logical annotation slot record (or "record"): A record that holds a logical slot location and an associated label index.

Current record: the record being processed.

Pair of records: a set of two adjacent records that are processed at the same time. This consists of the current record and the next adjacent record. One record in the pair will be modified if the slot number for the second record in the pair is not greater than the slot number for the first record in the pair.

First record in a pair: this is the same as the current record.

Second record: the record that follows the current record in the list of records. There may not be one of these.

Third record: the record that follows the second record in the list of records. There may not be one of these. This is not modified while it is the third record.

In one embodiment, a computer system environment 100, illustrated in FIG. 1, includes a computer housing 102 that contains a processor 104, such as a microprocessor; a random access memory 106 ("RAM"); a read only memory 108 ("ROM"); one or more storage devices 110, such as hard drives, optical drives, solid state drives, and other similar devices; interconnected by a bus 112. In one embodiment, one or more network interfaces 114 and one or more input/output ("I/O") interfaces 116 provide external interfaces for the processor 104 through the bus 112. In one embodiment, one or more cursor control devices 118, such as a mouse, a track pad, a graphics tablet, or the like, interface with the processor 104 through the I/O interface 116 and allow a user to manipulate a cursor. In one embodiment, one or more input devices 120, such as a keyboard, a keypad, or the like, interface with the processor 104 through the I/O interface 116 and allow the user to input characters, numbers, drawings, and the like. In one embodiment, one or more graphical user interfaces 122 interfaces with the processor 104 through the I/O interface 116 and allows the processor 104 to display text, graphics, and other information. In one embodiment, one or more output devices 124, such as printers, plotters, or the like, interface with the processor 104 through the I/O interface 116 and, for example, allow the production of hard copy output.

In one embodiment, the processor 104 interfaces with a local area network ("LAN") 126 through the network interface 114. In one embodiment, the processor 104 can communicate with other computers through the LAN 126. In one embodiment, the processor has access to the Internet 128 through the LAN 126.

In one embodiment, a computer program to implement the techniques described herein is stored on a non-transitory computer readable medium 130, such as a compact disk ("CD"), a digital versatile disc or digital video disc ("DVD"), an external solid state drive, or the like. In one embodiment, the medium 130 is loaded into a storage device 110, such as an optical drive, and the computer program is read from the medium and stored in the RAM 106, the ROM 108, or another storage device 110, such as a hard drive. In one embodiment, the computer program is compiled and linked, if necessary, and further prepared for execution. In one embodiment, and executable image of the computer program is stored in the RAM 106, the ROM 108, or another storage device 110, such as a hard drive. In one embodiment, the processor 104 executes the executable image, receive inputs from the cursor control 118 and input device 120, stores data in the RAM 106 and/or ROM 108, and produce outputs on the graphical user interface 122 and the output device 124.

Figure 2:
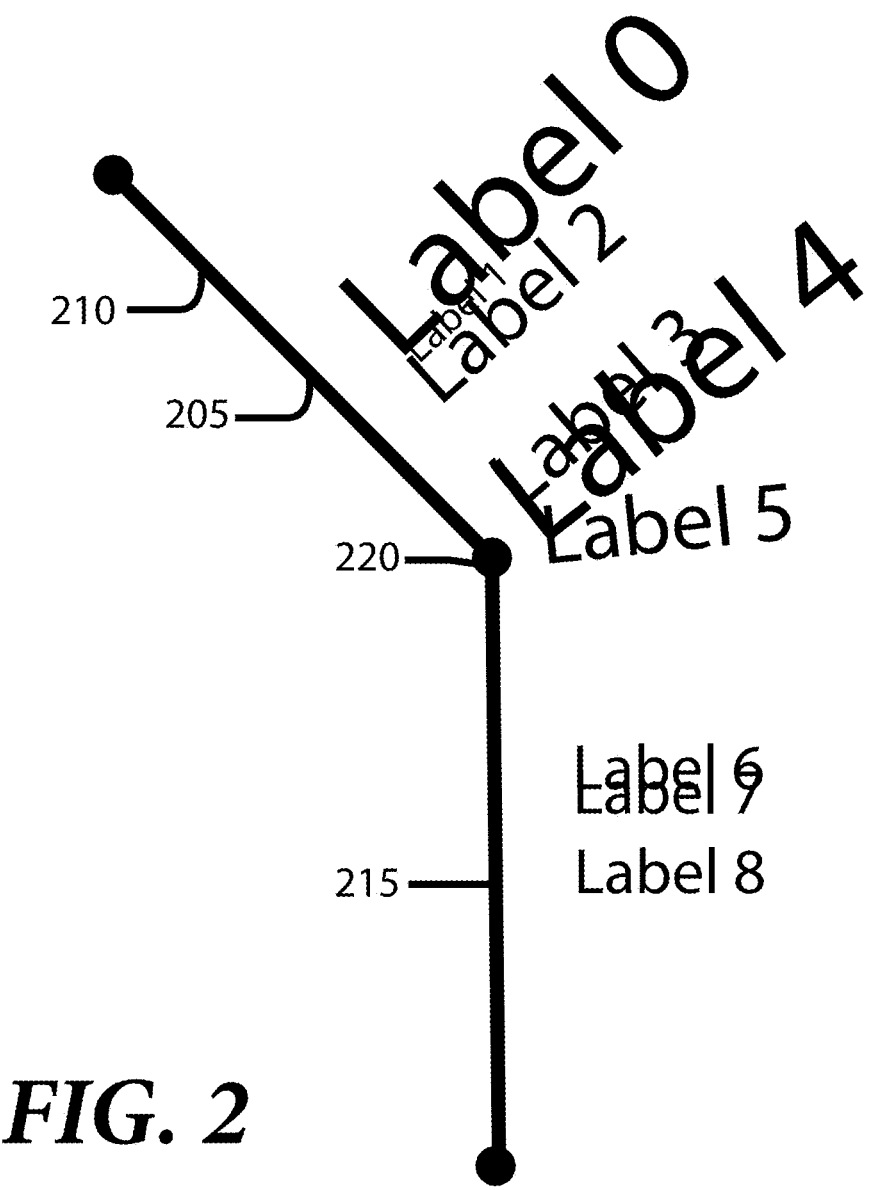
FIG. 2 shows a polyline and overposted annotations.

An example of annotations along a polyline, illustrated in FIG. 2, includes a polyline 205 including two contiguous line segments 210 and 215 connected at node 220. Annotations (i.e., "Label 0" through "Label 8") are arrayed along the polyline 205 at the annotation location with which they are associated. As can be seen, several of the annotations overlap. In particular, Label 1 overlaps Label 0 and Label 2 (making them "clustered annotations"), Label 4 overlaps Label 3 and Label 5 (making them "clustered annotations"), and Label 7 overlaps Label 6 (making them "clustered annotations"). Further, as can be seen in FIG. 2, the annotations have different font sizes. For example, Label 0 has a larger font size than Label 2, which has a larger font size than Label 1.

Figure 3:
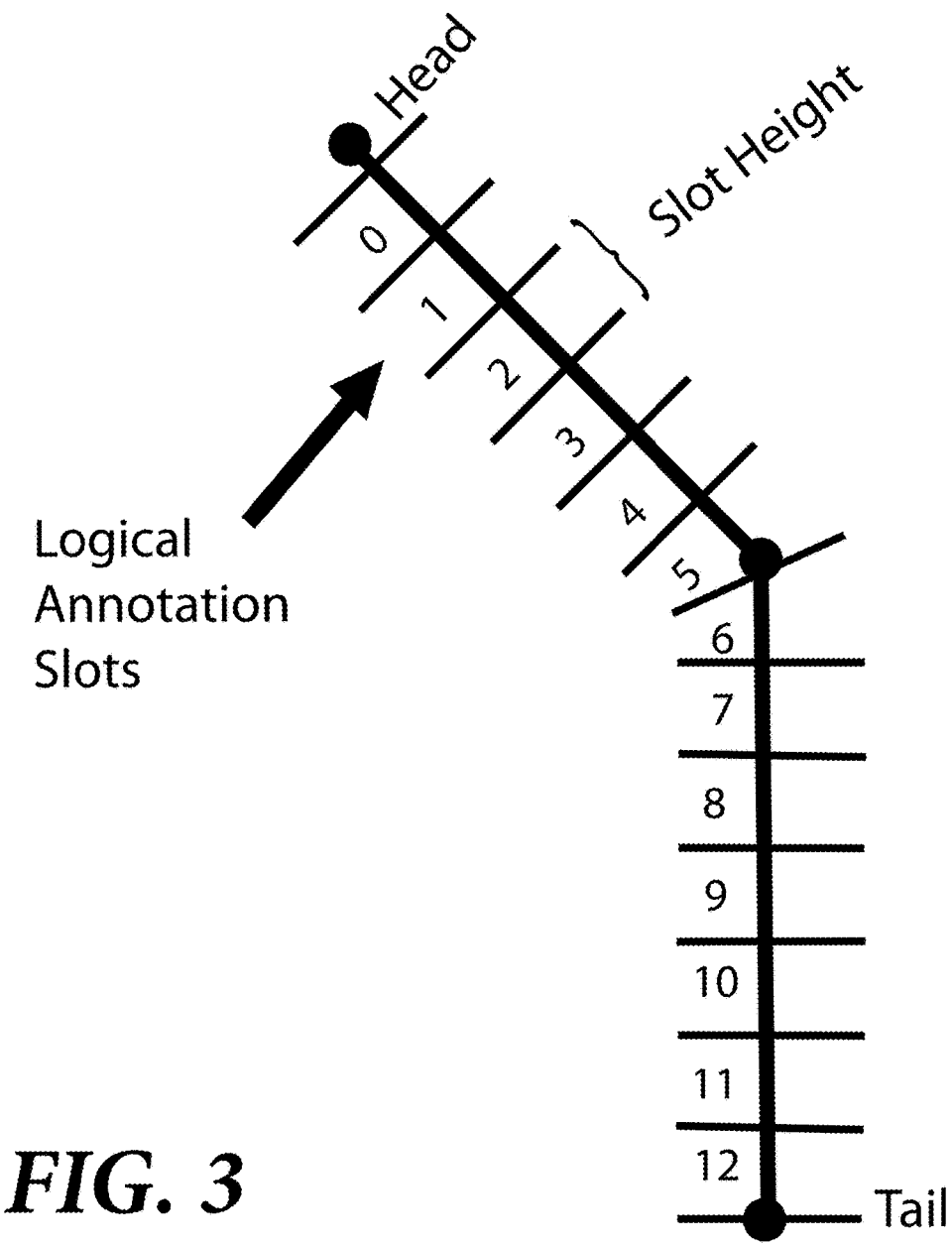
FIG. 3 shows a polyline with logical annotation slots.
Figure 4:
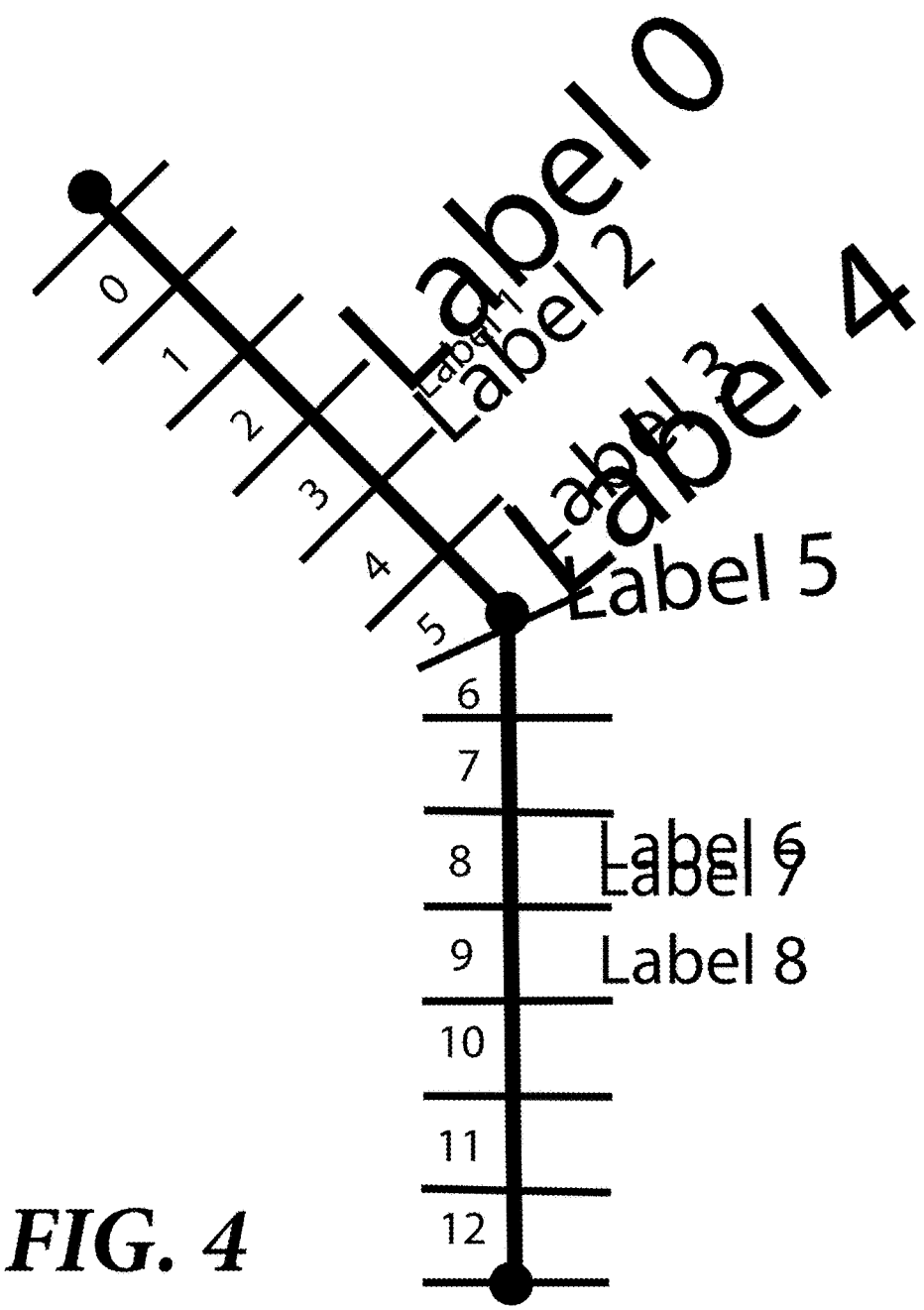
FIG. 4 shows the polyline and overposted annotations of FIG. 2 with logical annotation slots.

In one embodiment, illustrated in FIG. 3, the polyline 205 has a head and a tail. In one embodiment, as illustrated in FIG. 3, the polyline is divided into logical annotation slots numbered consecutively from the head of the polyline to the tail of the polyline. Each logical annotation slot has a slot height, as illustrated in FIG. 3. The correlation of annotations to logical annotation slots is illustrated in FIG. 4. Simply assigning annotations to the logical annotation slot nearest to their respective annotation location would likely increase overposting, rather than improving it.

Figure 5:
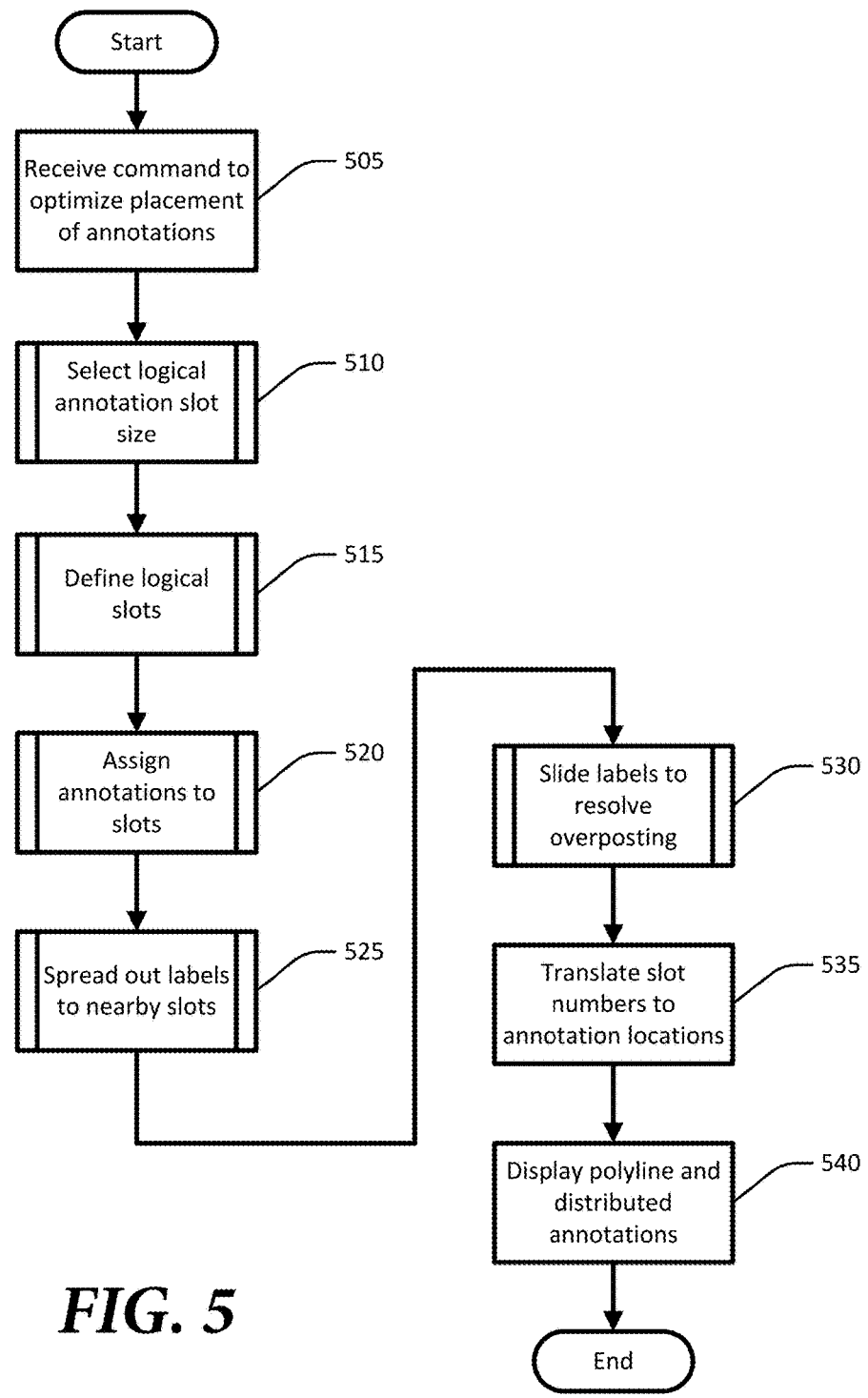
FIGS. 5-9 and 11-13 show flow charts.

At a high level, as illustrated in FIG. 5, the technique for reducing overposting of clustered annotations begins with receipt by processor 104 of a command to optimize placement of annotations (block 505). In one embodiment, the command comes in the form of any of the traditional methods, including a menu selection, a radio button, a command line command, etc. Alternatively, the command may be issued by a program without user intervention.

Figure 6:
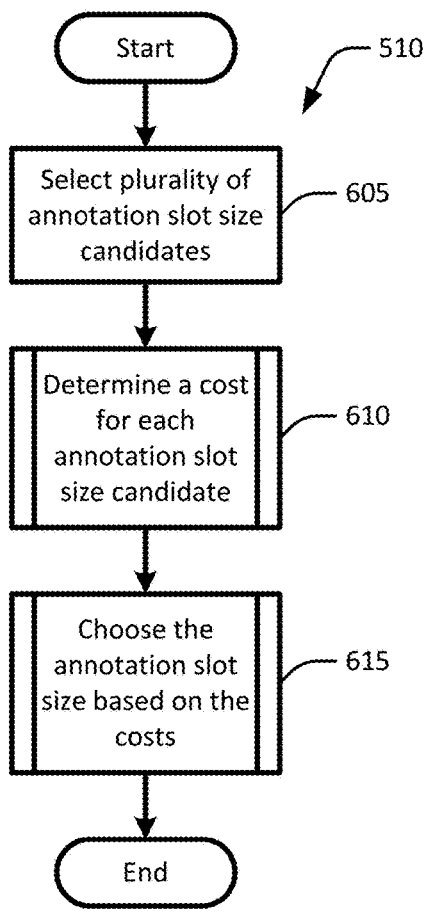

In one embodiment, the technique continues by selecting the logical annotation slot size (block 510), which is described in more detail in connection with FIGS. 6-8.

In one embodiment, the technique continues by defining the logical annotation slots (block 515), which is described in more detail in connection with FIG. 9.

In one embodiment, the technique continues by assigning annotations to slots (block 520) as described in more detail in connection with FIG. 10.

In one embodiment, the technique continues by spreading out labels to nearby slots (block 525), which is described in more detail in connection with FIG. 11.

In one embodiment, the technique continues by sliding labels to resolve overposting (block 530), which is described in more detail in connection with FIGS. 12 and 13.

In one embodiment, the slot indices are translated to annotation locations (block 535) and the polyline and distributed annotations are displayed (block 540).

Three constraints were considered in devising one embodiment of a technique for selecting an annotation slot size:
  the number of used slots is minimized in order to minimize computation time,
  the amount of unused space in each slot is minimized in order to facilitate attractive drawings,
  the amount of time spent selecting the annotation slot size is kept to a minimum.

The chosen technique is an optimization problem over an extremely small domain. A cost function is defined and minimized over a list of candidate slot sizes. The number of candidate slot sizes is limited to minimize the time spent calculating the slot size. It is recognized that limiting the domain may lead to results that would not be optimal for a large domain, but that is taken to be acceptable due to the desired limitation of calculation time. In one embodiment, the candidate list is derived from the font sizes and includes each of the fonts' heights and some of the heights' divisors.

One embodiment of the technique for selecting the annotation slot size will now be described in reference to FIGS. 6-8. In one embodiment, a plurality of annotation slot size candidates is selected (block 605). In one embodiment, the heights of the font sizes of each of the plurality of annotations are selected as annotation slot size candidates. For example, the annotations in FIG. 2 have font sizes of 40 points (Label 0, Label 4; where a "point" is defined to be $\frac{1}{72}$ of an inch), 24 points (Label 2, Label 3, and Label 5), 18 points (Label 6, Label 7, and Label 8) and 12 points (Label 1), then the annotation slot size candidates would include 40 points, 24 points, 18 points, and 12 points.

In one embodiment, the heights of the font sizes of each of the plurality of annotations divided by a set of divisors are also selected as annotation slot size candidates. For example, in one embodiment, the set of integers is {2, 3, 4, 5}, meaning that 40 points, 24 points, 18 points, and 12 points divided by those integers, producing the following set of distinct (i.e., duplicates are discarded) annotation slot size candidates (in points): {40, 24, 20, 18, 13.333333, 12, 10, 9, 8, 6, 4.5, 4, 3}.

In one embodiment, a different set of integers is used. In one embodiment, a larger set of integers are used. In one embodiment, a smaller set of integers is used. In one embodiment, the set of divisors includes at least one real number (i.e., not necessarily an integer).

In one embodiment, a different technique for choosing the annotation slot size candidates is used, such as using a random distribution of numbers between 0 and the largest font size.

In one embodiment, a cost is determined for each annotation slot size candidate (block 610). Define the following variables:
  i indicates a respective font used in the annotation strings; for example, FIG. 2 shows 4 fonts: font i=0 for Label 0 and Label 4; font i=1 for Label 2, Label 3, and Label 5; font i=2 for Label 6, Label 7, and Label 8; and font i=3 for Label 1;
  N is the total number of annotation strings; for example, FIG. 2 shows 9 annotation strings (Label 0, Label 1, Label 2, Label 3, Label 4, Label 5, Label 6, Label 7, Label 8) so N=9;
  $n_i$ is the number of annotation strings to be drawn in each font i; for the example shown in FIG. 2 and defined further above, $n_0$=2, $n_1$=3, $n_2$=3 and $n_3$=1;

$h_i$ is the height of each font i; for example, in the example just discussed, $h_0=40$, $h_1=24$, $h_2=18$, and $h_3=12$; in one embodiment (not shown), the height of each font is adjusted to account for ascenders and descenders associated with the font;

m is the number of annotation slot size candidates; in the example just discussed, m=13;

j denotes each of the m annotation slot size candidates;

$c_j$ denotes the height of each annotation slot size candidate j; for example, in the example just discussed (the heights are in points but, in some embodiments, would be converted to inches for the calculation): $c_0=3$, $c_1=4$, $c_2=4.5$, $c_3=6$, $c_4=8$, $c_5=9$, $c_6=10$, $c_7=12$, $c_8=13.3333$, $c_9=18$, $c_{10}=20$, $c_{11}=24$, $c_{12}=40$;

w is a weighting variable determined experimentally and provides a way to balance the competing interests of having each font fit exactly into its slot and not creating any extra slots; in one embodiment, w=5.

Calculate a cost function $F_j$, j=1 . . . m as follows (see block 705 in FIG. 7, which provides additional detail for block 610):

Let P be the total length of the polyline (e.g. in FIG. 3, P would be the distance along polyline 205 from its head to its tail). In the example shown in FIG. 2, P=320 points.

Let $H=\Sigma_i h_i n_i$ be the minimum size needed to hold all of the annotations.

Define $s_{ij}$ to be the smallest integer such that $s_{ij}c_j > h_i$. This is the number of slots for logical annotation slot candidate j that will be used to hold one annotation of font size i.

Let $A_{ij}=s_{ij}n_i c_j$ be the total space used to store the annotation(s) of size i stored in slots of size $c_j$.

Let $A_j=\Sigma_i A_{ij}$ be the space used to hold all of the annotation for the annotation slot size candidate j.

Let $$W_j = \frac{A_j - H}{H}$$

be the added space for annotation slot size candidate j normalized by the minimum space H.

Let $T_j=\Sigma_i s_{ij} n_i$ be the total number of slots needed for annotation slot size candidate j.

Let $$E_j = \frac{T_j - N}{N}$$

be the added slots for slot size candidate j normalized by the minimum number of slots N (which is also the total number of annotation strings).

Figure 7:
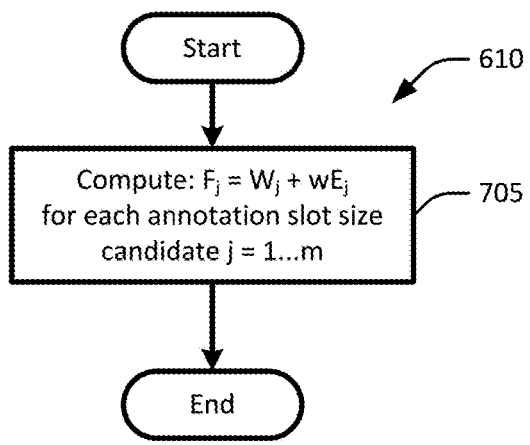

Calculate $F_j=W_j+wE_j$ as the cost for annotation slot size candidate j, j=1 . . . m (block 705, FIG. 7).

Or, Fj can be calculated directly as:

$$F_j = \frac{\sum_i s_{ij} n_i c_j - \sum_i h_i n_i}{\sum_i h_i n_i} + w \frac{\sum_i s_{ij} n_i - N}{N}$$

For the example shown in FIG. 2, the results of these calculations are as follows:

Candidates:
j=0, 3.0 points
j=1, 4.0 points
j=2, 4.5 points
j=3, 6.0 points
j=4, 8.0 points
j=5, 9.0 points
j=6, 10.0 points
j=7, 12.0 points
j=8, 13.333333 points
j=9, 18.0 points
j=10, 20.0 points
j=11, 24.0 points
j=12, 40.0 points candidate j=0, 3.0 points
number of slots per annotation of height 40.0, $s_{00}=14$
number of slots per annotation of height 24.0, $s_{10}=8$
number of slots per annotation of height 18.0, $s_{20}=6$
number of slots per annotation of height 12.0, $s_{30}=4$
Total space: $A_0=222.0$ points, $T_0=74.0$ slots
normalized: $E_0=0.018348623$, $W_0=7.2222223$
cost: $F_0=7.3139653$ candidate j=1, 4.0 points
number of slots per annotation of height 40.0, $s_{01}=10$
number of slots per annotation of height 24.0, $s_{11}=6$
number of slots per annotation of height 18.0, $s_{21}=5$
number of slots per annotation of height 12.0, $s_{31}=3$
Total space: $A_1=224.0$ points, $T_1=56.0$
normalized: $E_1=0.027522936$, $W_1=5.2222223$
cost: $F_1=5.359837$ candidate j=2, 4.5 points
number of slots per annotation of height 40.0, $s_{02}=9$
number of slots per annotation of height 24.0, $s_{12}=6$
number of slots per annotation of height 18.0, $s_{21}=4$
number of slots per annotation of height 12.0, $s_{22}=3$
Total space: $A_2=229.5$ points, $T_2=51.0$ slots
normalized: $E_2=0.052752294$, $W_2=4.6666665$
cost: $F_2=4.930428$ candidate j=3, 6.0 points
number of slots per annotation of height 40.0, $s_{03}=7$
number of slots per annotation of height 24.0, $s_{13}=4$
number of slots per annotation of height 18.0, $s_{23}=3$
number of slots per annotation of height 12.0, $s_{33}=2$
Total space: $A_3=222.0$ points, $T_3=37.0$ slots
normalized: $E_3=0.018348623$, $W_3=3.1111112$
cost: $F_3=3.2028542$ candidate j=4, 8.0 points
number of slots per annotation of height 40.0, $s_{04}=5$
number of slots per annotation of height 24.0, $s_{14}=3$
number of slots per annotation of height 18.0, $s_{24}=3$
number of slots per annotation of height 12.0, $s_{34}=2$
Total space: $A_4=240.0$ points, $T_4=30.0$ slots
normalized: $E_4=0.10091743$, $W_4=2.3333333$
cost: $F_4=2.8379204$ candidate j=5, 9.0 points
number of slots per annotation of height 40.0, $s_{05}=5$
number of slots per annotation of height 24.0, $s_{15}=3$
number of slots per annotation of height 18.0, $s_{25}=2$
number of slots per annotation of height 12.0, $s_{35}=2$
Total space: $A_5=243.0$, points, $T_5=27.0$ slots
normalized: $E_5=0.1146789$, $W_5=2.0$
cost: $F_5=2.5733945$ candidate j=6, 10.0 points
number of slots per annotation of height 40.0, $s_{06}=4$
number of slots per annotation of height 24.0, $s_{16}=3$
number of slots per annotation of height 18.0, $s_{26}=2$
number of slots per annotation of height 12.0, $s_{36}=2$ Total space: $A_6$=250.0 points, $T_6$=25.0 slots
normalized: $E_6$=0.14678898, $W_6$=1.7777778
cost: $F_6$=2.5117226
candidate j=7, 12.0 points
number of slots per annotation of height 40.0, $s_{07}$=4
number of slots per annotation of height 24.0, $s_{17}$=2
number of slots per annotation of height 18.0, $s_{27}$=2
number of slots per annotation of height 12.0, $s_{37}$=1
Total space: $A_7$=252.0 points, $T_7$=21.0 slots
normalized: $E_7$=0.1559633, $W_7$=1.3333334
cost: $F_7$=2.11315
candidate j=8, 13.333333 points
number of slots per annotation of height 40.0, $s_{08}$=3
number of slots per annotation of height 24.0, $s_{18}$=2
number of slots per annotation of height 18.0, $s_{28}$=2
number of slots per annotation of height 12.0, $s_{38}$=1
Total space: $A_8$=253.33333 points, $T_8$=19.0 slots
normalized: $E_8$=0.16207948, $W_8$=1.1111112
cost: $F_8$=1.9215086
candidate j=9, 18.0 points
number of slots per annotation of height 40.0, $s_{09}$=3
number of slots per annotation of height 24.0, $s_{19}$=2
number of slots per annotation of height 18.0, $s_{29}$=1
number of slots per annotation of height 12.0, $s_{39}$=1
Total space: $A_9$=288.0 points, $T_9$=16.0 slots
normalized: $E_9$=0.32110092, $W_9$=0.7777778
cost: $F_9$=2.3832824
candidate j=10, 20.0 points
number of slots per annotation of height 40.0, $s_{010}$=2
number of slots per annotation of height 24.0, $s_{210}$=2
number of slots per annotation of height 18.0, $s_{310}$=1
number of slots per annotation of height 12.0, $s_{410}$=1
Total space: $A_{10}$=280.0 points, $T_{10}$=14.0 slots
normalized: $E_{10}$=0.28440368, $W_{10}$=0.5555556
cost: $F_{10}$=1.977574
candidate j=11, 24.0 points
number of slots per annotation of height 40.0, $s_{011}$=2
number of slots per annotation of height 24.0, $s_{111}$=1
number of slots per annotation of height 18.0, $s_{211}$=1
number of slots per annotation of height 12.0, $s_{311}$=1
Total space: $A_{11}$=264.0 points, $T_{11}$=11.0 slots
normalized: $E_{11}$=0.21100917, $W_{11}$=0.22222222
cost: $F_{11}$=1.277268
candidate j=12, 40.0 points
number of slots per annotation of height 40.0, $s_{012}$=1
number of slots per annotation of height 24.0, $s_{112}$=1
number of slots per annotation of height 18.0, $s_{212}$=1
number of slots per annotation of height 12.0, $s_{312}$=1
Total space: $A_{12}$=360.0 points, $A_{12}$=9.0 slots
normalized: $E_{12}$=0.6513761, $A_{12}$=0.0
cost: $F_{12}$=3.2568808

Figure 8:
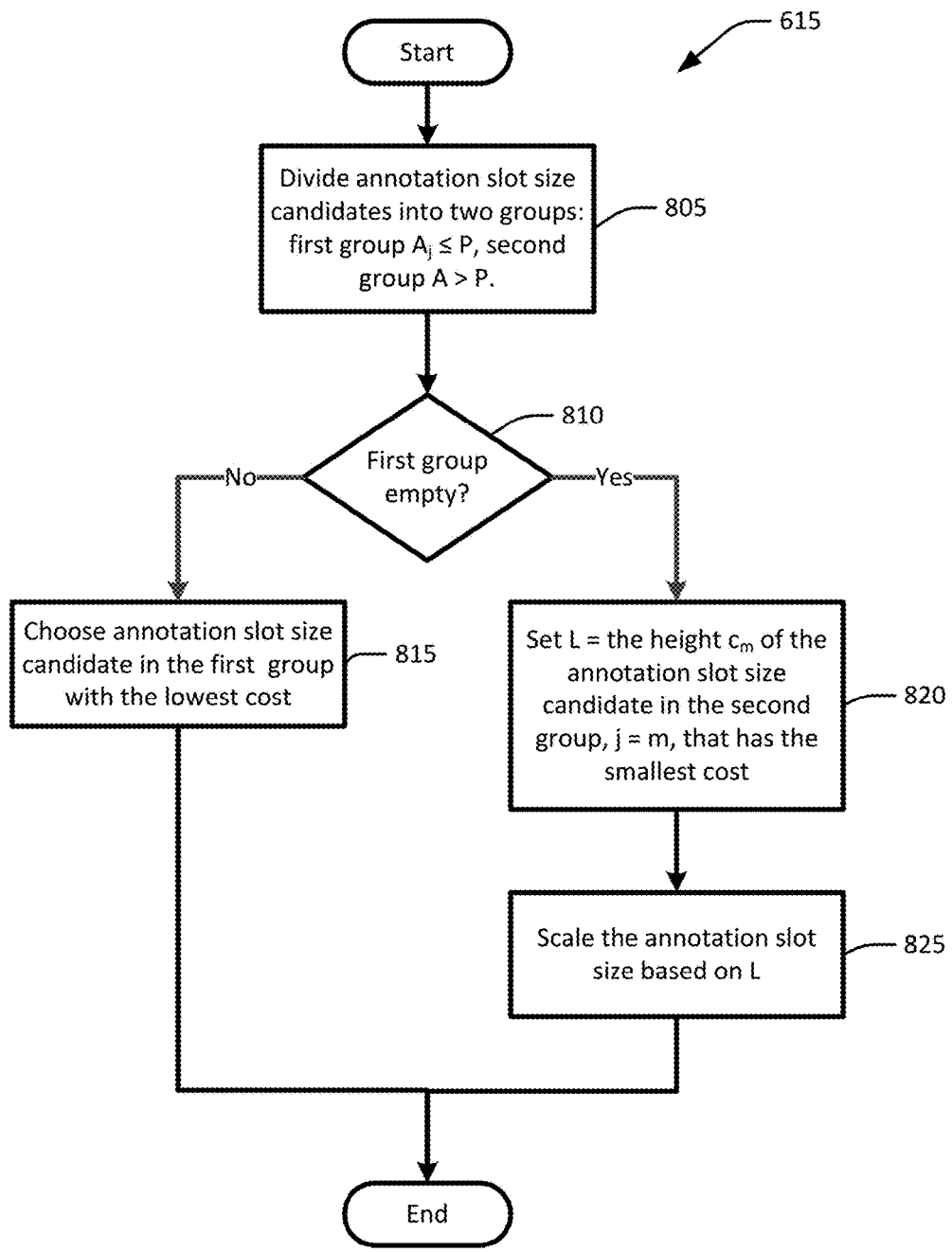

In one embodiment, the technique chooses the annotation slot size based on the costs $F_j$, j=0 . . . m (block 615), as shown in more detail in FIG. 8.

In one embodiment, the annotation slot size candidates are divided into two groups (block 805). In one embodiment, the first group includes those annotation slot size candidates for which $A_j \leq P$. Those are the annotation slot size candidates for which the text will fit next to the polyline. In the example shown above, the first group includes all annotation slot size candidates except candidate j=12, for which $A_{12}$=360, which is greater than P=320. In one embodiment, this is the preferred group of annotation slot size candidates.

In one embodiment, the second group includes those annotation slot size candidates for which $A_j > P$. Those are the candidates for which the text will not fit next to the polyline without overposting. In the example shown above, the second group includes annotation slot size candidate j=12. These will only be used if there are no annotation slot size candidates in the first group.

In one embodiment, if the first group is not empty (the "No" branch out of block 810), meaning that there are annotation slot size candidates for which the annotations will fit next to the polyline, the height $c_j$ of the annotation slot size candidate j in the first group with the lowest cost $F_j$ is chosen (block 815) as the annotation slot size, K. In the example shown above, the first group is not empty and the annotation slot size candidate with the lowest cost $F_j$ is candidate j=11, with a slot size of 24 points.

If the first group is empty (the "Yes" branch out of block 810), meaning that there are no annotation slot size candidates for which the annotations will fit next to the polyline, the following processing is performed. Set L to be the height $c_j$ of the annotation slot size candidate j in the second group with the lowest cost $F_j$ (block 820) Then scale the annotation slot size, K, based on L so that the annotations fit next to the polyline by applying the following function (block 825):

$$K = L \times A_j / P$$

Returning to FIG. 5, in one embodiment the technique continues by defining the logical annotation slots (block 515). In one embodiment, illustrated in FIG. 9, the number of logical annotation slots is determined by dividing the total length of the polyline, P, by the calculated annotation slot size, K, and truncating to the next smallest integer (block 905). For example, if P=12.5 and K=1, P/K=12.5 and the number of logical slots would be 12 (12.5 truncated to the next smallest integer).

The logical annotation slots illustrated in FIGS. 3 and 4 were derived using this technique for the polyline 205 and annotations illustrated in FIG. 2.

In one embodiment, the starting depth for the slots is one half the difference between total length of the line and the total length of the logical annotation slots. For example, if P=12.5 and K=1, the number of logical annotation slots is 12, the total length of the logical annotation slots is 12 inches, and the starting depth for the slots is 0.25 inches ((12.5−12)/2)

In one embodiment, the top depth for a logical annotation slot may be found by multiplying the annotation slot index for that logical annotation slot by the slot height and adding the starting depth. For example, referring to FIG. 3 and assuming (a) the slot height is 1 inch, (b) the annotation slot index for logical annotation slot 3 is 3, and (c) the starting depth is 0, the top depth of annotation slot 3 is 3 inches.

In one embodiment, the bottom depth for a logical annotation slot may be found by incrementing the annotation slot index for that logical annotation slot by one, multiplying the result by the slot height, and adding the starting depth. For example, referring to FIG. 3 and assuming (a) the slot height is 1 inch, (b) the annotation slot index for annotation slot 3 is 3, and (c) the starting depth is 0, the bottom depth of logical annotation slot 3 is 4 inches.

Figure 9:
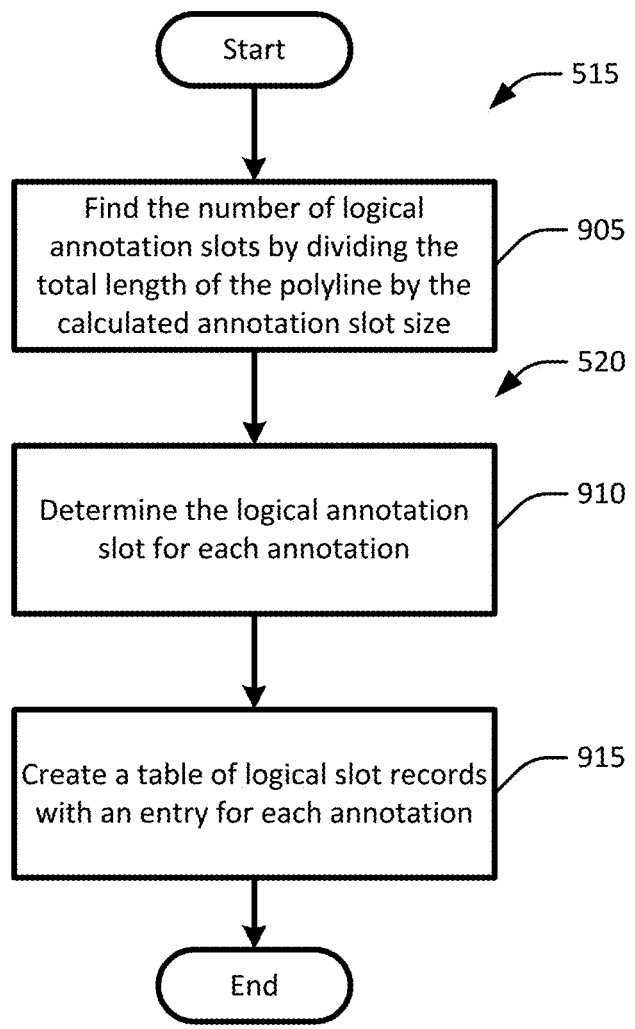

In one embodiment, the logical annotation slot is determined for each annotation (block 520, see FIG. 5) by comparing its annotation location with the top and bottom depths of the logical annotation slots (block 910, see FIG. 9). For example, referring to FIG. 4, assume that the annotation location of the "Label 0" annotation is 3.5 inches. That annotation location is between the bottom depth and the top depth of logical annotation slot 3. As a result annotation "Label 0" is assigned to logical annotation slot 3.

In one embodiment, a table of logical slot records is created with entries for each of the logical annotation slots that is occupied by an annotation (block 915, see FIG. 9). In one embodiment, if an annotation is taller than a single logical annotation slot, the number of slot locations that were calculated for that annotation in the optimization step is added. In one embodiment, if the slot size was adjusted because of lack of space along the polyline then the number of slots locations that were calculated previously is used.

An example of such a table of logical slot records is illustrated in FIG. 10 under the "Before" heading, which was derived using the example shown in FIG. 4. As can be seen the table includes 11 records, each having a unique number (i.e., 0-10) included in the "Record" column. The "Label" column identifies the label by index. The "Slot" column identifies the logical annotation slot to which the annotation or label for that row is associated. For example, records 0 and 1 indicate that label 0 is assigned to logical annotation slot 3 and, because there are two records, it will span two logical annotation slots. Record 2 indicates that label 1 is assigned to logical annotation slot 3. Record 3 indicates that label 2 is assigned to logical annotation slot 4. Record 4 indicates that label 3 is assigned to logical annotation slot 5. Records 5 and 6 indicate that label 4 is assigned to logical annotation slot 5 and, because there are two records, it will span two logical annotation slots. Record 7 indicates that label 5 is assigned to logical annotation slot 6. Record 8 indicates that label 6 is assigned to logical annotation slot 8. Record 9 indicates that label 7 is assigned to logical annotation slot 8. Record 10 indicates that label 8 is assigned to logical annotation slot 9.

In one embodiment, overposting is evident in the "Before" table in FIG. 10. Two labels are assigned to each of slots 3, 5, and 8.

In one embodiment, the technique continues by adjusting the annotation locations for the annotations so that each of the annotations falls into a range of slots that is not occupied by any other annotation. In one embodiment, this is done by finding groups of labels in the table of logical slot records that lie in the same calculated slot and reassigning the annotations in those groups into adjacent slots if there is room without moving any neighboring annotations. Then, in one embodiment, the table of logical slot records is processed repeatedly until no logical annotation slot changes. In one embodiment, with each pass a pair of records in the table of logical slot records is compared to determine if one or the other should be adjusted.

Figure 11:
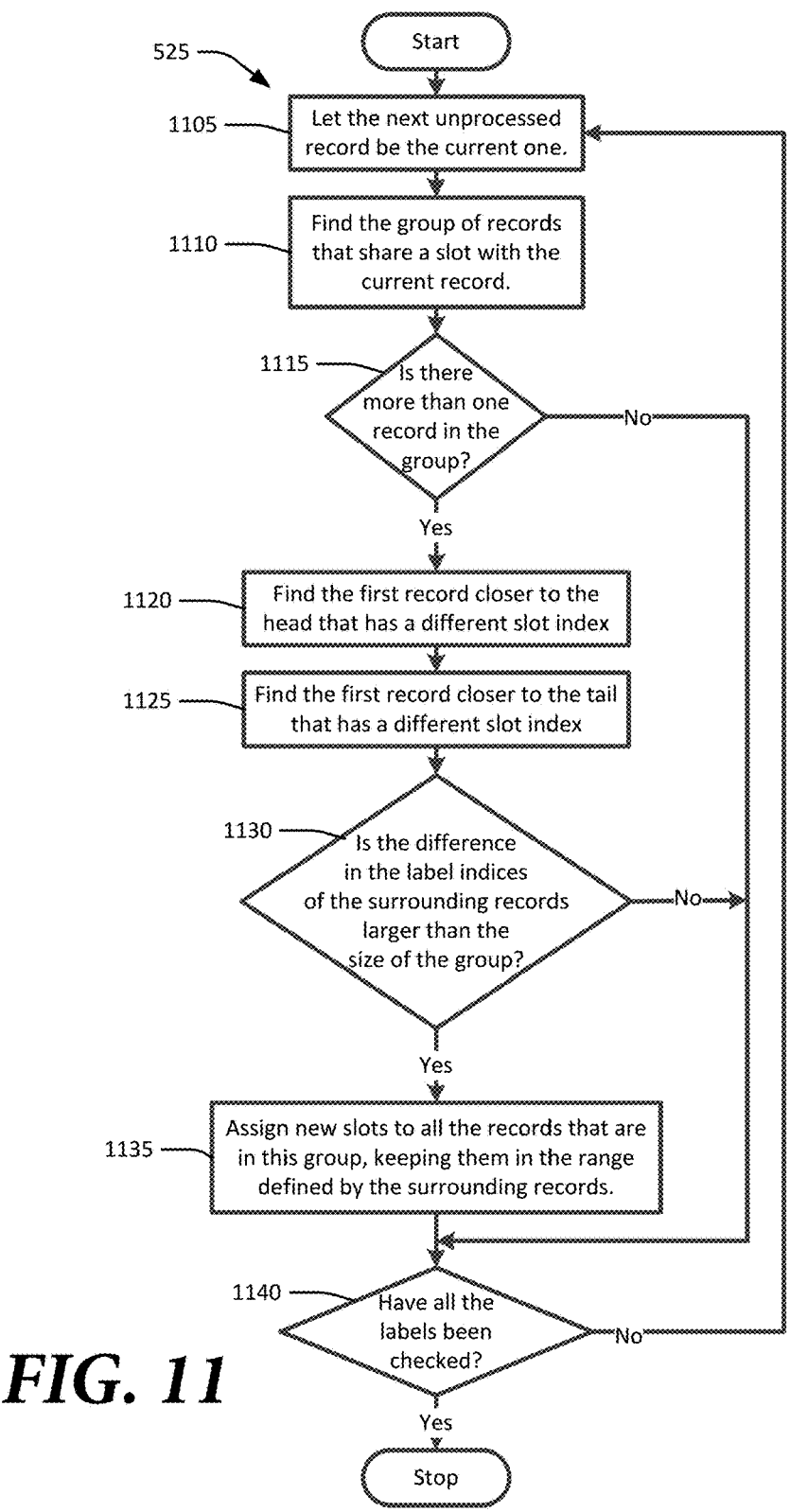

Returning to FIG. 5, the process of adjusting annotation locations begins by spreading the labels out to nearby slots (block 525), which is shown in more detail in FIG. 11. The process enters a loop and begins by recognizing the next unprocessed record as the current record (block 1105). Using the example table shown in FIG. 10, record 0 is recognized as the current record the first pass through the loop. Successive records (i.e., records 1, 2, 3, etc.) are recognized as the current record in subsequent passes through the loop.

The process then finds the group of records that share a logical annotation slot with the current record (block 1110). Using the example table shown in FIG. 10, when record 0 is the current record, the process will find that record 0 (Label 0) shares logical annotation slot 3 with record 1 (Label 0) and record 2 (Label 1). When record 4 is the current record, the process will find that record 4 (Label 3) shares logical annotation slot 5 with record 5 (Label 4) and record 6 (Label 4). When record 8 is the current record, the process will find that record 8 (Label 6) shares logical annotation slot 8 with record 9 (Label 7). The other records (records 3, 4, 7, and 10) do not share logical annotation slots with other records.

The process then determines that there is more than one record in the group ("Yes" branch out of block 1115) and finds the first record closer to the head that has a different slot index (block 1120). Using the example table shown in FIG. 10, when record 0 is the current record there is no such record and the "first record closer to the head that has a different slot index" is set to 0. When record 4 is the current record, the "first record closer to the head that has a different slot index" is record 3. When record 8 is the current record, the "first record closer to the head that has a different slot index" is record 7.

The process then finds the first record closer to the tail that has a different slot index (block 1125). Using the example table shown in FIG. 10, when record 0 is the current record, the "first record closer to the tail that has a different slot index" is record 3 with a slot index of 4. When record 4 is the current record, the "first record closer to the tail that has a different slot index" is record 7. When record 8 is the current record, the "first record closer to the head that has a different slot index" is record 10.

The process then determines if the difference in the label indices of the surrounding records is larger than the size of the group (block 1130). The situation for the three groups shown in example table in FIG. 10 is illustrated in Table 1 below. Note that the "slot at head side of group" for each group is the "slot" in the previous row incremented by one and that the "slot at the tail side of group" is the "slot" in the next row.

TABLE 1

| Group record numbers | Size of group (A) | Slot | Slot at head side of group | Slot at tail side of group | Difference (B) | B > A? |
|---|---|---|---|---|---|---|
| 0, 1, 2 | 3 | 3 | 0 | 4 | 4 − 0 = 4 | Yes |
| 3 | 1 | 4 | — | — | — | — |
| 4, 5, 6 | 3 | 5 | 4 + 1 = 5 | 6 | 6 − 5 = 1 | No |
| 7 | 1 | 6 | — | — | — | — |
| 8, 9 | 3 | 8 | 6 + 1 = 7 | 9 | 9 − 7 = 2 | Yes |
| 10 | 1 | 9 | — | — | — | — |

From Table 1 it can be seen that the "Yes" branch from block 1130 will be taken for the (0, 1, 2) group and the (8, 9) group and the "No" branch from block 1130 will be taken for the (4, 5, 6) group.

In one embodiment, if the "Yes" branch is taken from block 1130, new slots will be assigned to all the records in the group, keeping them in the range defined by the surrounding records (block 1135).

In one embodiment, this is done by first attempting to center the annotations by dividing the number of annotations in the slot by two (using integer division) and sliding the annotation with the lowest record number by that number of slots and the annotation with the highest record number up by that number of slots and then filling in. For example, assume the situation shown in Table 2 below (which is not related to the example that has been discussed up to this point):

TABLE 2

| Record | Label | Slot |
|---|---|---|
| 0 | 0 | 1 |
| 1 | 1 | 5 |
| 2 | 2 | 5 |
| 3 | 3 | 5 |

TABLE 2-continued

| Record | Label | Slot |
|--------|-------|------|
| 4 | 4 | 5 |
| 5 | 5 | 5 |
| 6 | 6 | 10 |

As can be seen, records 1-5 have all been assigned to slot 5. Dividing the number of annotations in slot 5, which is 5, by 2 (using integer division) produces a result of "2." There is room to move annotations by that amount in either direction. The result is shown in Table 3:

TABLE 3

| Record | Label | Slot |
|--------|-------|------|
| 0 | 0 | 1 |
| 1 | 1 | 3 |
| 2 | 2 | 4 |
| 3 | 3 | 5 |
| 4 | 4 | 6 |
| 5 | 5 | 7 |
| 6 | 6 | 10 |

Label 3 remains in slot 5. Label 1 is moved toward the head to slot 3. Label 4 is moved toward the head to slot 4 to the head. Label 4 is moved toward the tail to slot 6. Label 5 is moved toward the tail to slot 7.

In one embodiment, if there is not enough space in the direction of the tail to spread the annotations toward the tail, then the annotations are spread as evenly as possible toward the head. Take the example shown in Table 4, which is the same as the example in Table 2 except that Label 6 has been assigned to slot 7 instead of slot 10.

TABLE 4

| Record | Label | Slot |
|--------|-------|------|
| 0 | 0 | 1 |
| 1 | 1 | 5 |
| 2 | 2 | 5 |
| 3 | 3 | 5 |
| 4 | 4 | 5 |
| 5 | 5 | 5 |
| 6 | 6 | 7 |

As with Table 2, there are 5 annotations assigned to slot 5. There is not enough room to spread toward the tail because there is only one slot (slot 6) open between slot 5 and the tail, which means that the annotations are be spread as evenly as possible favoring the head. In one embodiment, this is done by offsetting the center of the spread annotations toward the head. The result is as shown in Table 5 below.

TABLE 5

| Record | Label | Slot |
|--------|-------|------|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |

Label 4 (rather than Label 3, as in the previous example) remains in slot 5. Label 1 is moved 3 slots (5/2 (integer)+n; n=1; subsequent attempts could increase n) toward the head to slot 2. Label 2 is moved toward the head to slot 3. Label 3 is moved toward the head to slot 4. Label 5 is moved toward the tail to slot 6.

In one embodiment, if there is not enough space in the direction of the head to spread the annotations toward the tail, then the annotations are spread as evenly as possible toward the tail. Take the example shown in Table 6.

TABLE 6

| Record | Label | Slot |
|--------|-------|------|
| 0 | 0 | 3 |
| 1 | 1 | 5 |
| 2 | 2 | 5 |
| 3 | 3 | 5 |
| 4 | 4 | 5 |
| 5 | 5 | 5 |
| 6 | 6 | 10 |

As with Table 2, there are 5 annotations assigned to slot 5. There is not enough room to spread toward the head because there is only one slot (slot 4) open between slot 5 and the tail, which means that the annotations must be spread as evenly as possible favoring the tail. The result is as shown in Table 7 below:

TABLE 7

| Record | Label | Slot |
|--------|-------|------|
| 0 | 0 | 3 |
| 1 | 1 | 4 |
| 2 | 2 | 5 |
| 3 | 3 | 6 |
| 4 | 4 | 7 |
| 5 | 5 | 8 |
| 6 | 6 | 10 |

Label 2 remains in slot 5. Label 5 is moved 3 slots (5/2 (integer)+n; n=1; subsequent attempts could increase n) toward the tail to slot 8. Label 1 is moved toward the head to slot 4. Label 3 is moved toward the tail to slot 6. Label 4 is moved toward the tail to slot 7. Label 5 is moved toward the tail to slot 8.

Returning to the example table shown in FIG. 10 and Table 1, the (0, 1, 2) group has 3 members and would like to move 1 (3/2 integer) slot each way. There is no room in the tail direction so the (0, 1, 2) records are move to the (1, 2, 3) slots, respectively. Similarly, the (8, 9) group has two members and would like to move 1 (2/2) slot each way. There is no room in the head direction, so the (8, 9) records are moved to the (8, 9) slots, respectively.

In one embodiment, the process then determines if all the labels have been checked (block 1140. If not all labels have been checked ("No" branch from block 1140, processing returns to block 1105 for the next unprocessed record. In one embodiment, once one record in a group is processed all records in the group are processed. So, for example, after the 0 record in the 0, 1, 2 record is processed, the 1 and 2 records are also considered processed. In one embodiment, if the "No" branch is taken from block 1130, block 1140 is processed as described above. If all labels have been checked ("Yes" branch from block 1140, this portion of the process ends. The resulting intermediate table is shown in Table 8 below.

TABLE 8

| Record | Label | Slot |
|---|---|---|
| 0 | 0 | 1 |
| 1 | 0 | 2 |
| 2 | 1 | 3 |
| 3 | 2 | 4 |
| 4 | 3 | 5 |
| 5 | 4 | 5 |
| 6 | 4 | 5 |
| 7 | 5 | 6 |
| 8 | 6 | 7 |
| 9 | 7 | 8 |
| 10 | 8 | 9 |

Figure 12:
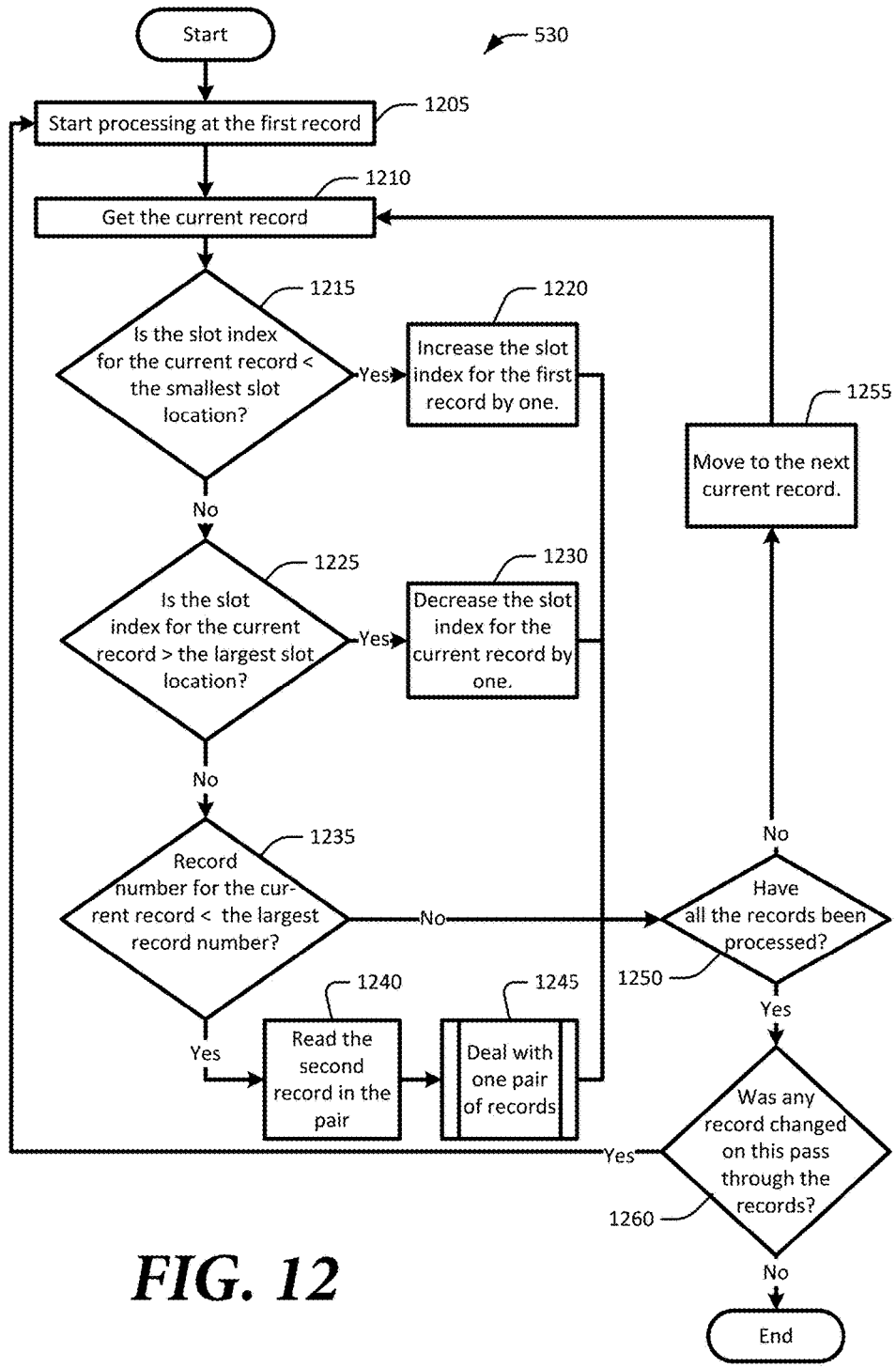

Returning to FIG. 5, the process continues by sliding labels to resolve overposting (block 530, which is shown in more detail in FIG. 12. Processing starts at the first record (block 1205. For example using the example shown in Table 8, processing starts with record 0.

The process enters a loop and gets the current record (block 1210. On the first pass through the loop for the example shown in Table 8, for example, the process would get record 0.

The process then determines if the slot index for the current record less than the smallest slot location (block 1215. If it is (the "Yes" branch from block 1215, the slot index for the current record is increased by one (block 1220. If it is not (the "No" branch from block 1215, the process determines if the slot index for the current record is greater than the largest slot location (block 1225. If it is (the "Yes" branch from block 1225, the slot index for the current record is decreased by one (block 1230. If it is not, the process determines if the record number for the current record is less than the smallest slot location (block 1235. If it is ("Yes" branch out of block 1235, the process reads the second record in the pair (block 1240 and continues with a "deal with one pair of records" process (block 1245, described in more detail in connection with FIG. 13.

On completion of block 1220, block 1230, or block 1245, or if the record number for the current record is not less than the largest record number ("No" branch from block 1235, the process determines if all of the records have been processed (block 1250. If they have not (the "No" branch from block 1250, the processor moves to the next current record (block 1255 and processing returns to block 1210.

If all of the records have been processed (the "Yes" branch from block 1250, the process determines if any record was changed on this pass through the records (block 1260. If a record was changed (the "Yes" branch from block 1260, processing returns to block 1205. If no records were changed on this pass (the "No" branch from block 1260, the process of sliding labels to resolve overposting ends.

Figure 13:
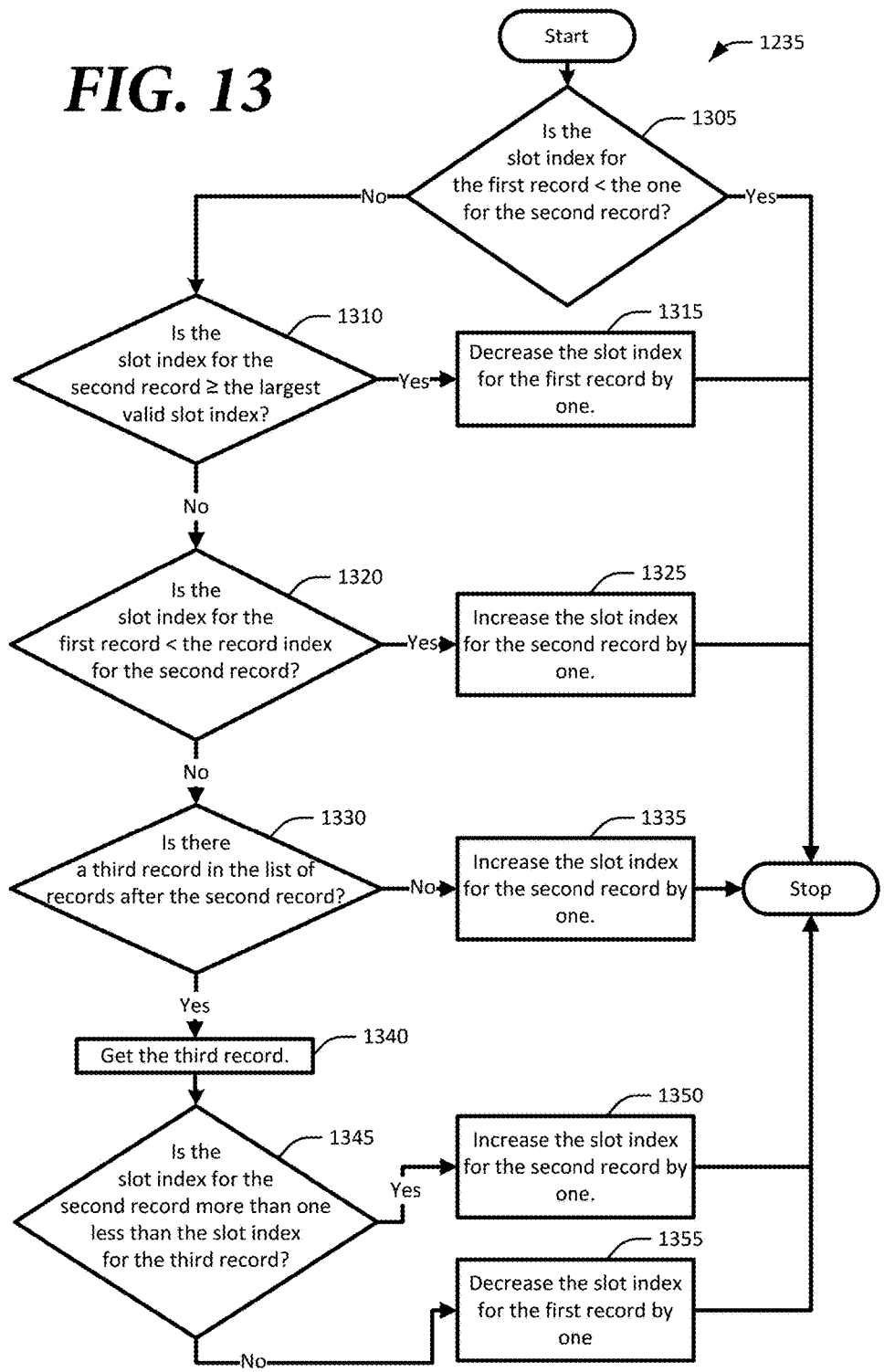

The "deal with one pair of records" process (block 1245, illustrated in more detail in FIG. 13, begins by determining if the slot index for the first record is smaller than the slot index for the second record (block 1305. If it is (the "Yes" branch from block 1305, the "deal with one pair of records" process ends.

If it is not (the "No" branch from block 1305, the process determines if the slot index for the second record is greater or equal to than the largest valid slot index (block 1310. If it is ("Yes" branch from block 1310, the slot index for the first record is decreased by one (block 1315 and the "deal with one pair of records" process ends.

If it is not (the "No" branch from block 1310), the process determines if the slot index for the first record is less than the record index for the second record (block 1320. If it is (the "Yes" branch from block 1320), the slot index for the second record is increased by one (block 1325) and the "deal with one pair of records" process ends.

If it is not (the "No" branch from block 1320), the process determines if there is a third record in the list of records after the second record (block 1330). If there is not (the "No" branch from block 1330), the slot index for the second record is increased by one (block 1335) and the "deal with one pair of records"), the slot index for the second record is increased by one (block 1335) and the "deal with one pair of records" process ends.

If there is (the "Yes" branch from block 1330), the process gets the third record (block 1340) and determines if the slot index for the second record is more than one less than the slot index for the third record (block 1345). If there is (the "Yes" branch from block 1345), the slot index for the second record is increased by one (block 1350) and the "deal with one pair of records" process ends. If there is not (the "No" branch from block 1340), the slot index for the first record is decreased by one (block 1355) and the "deal with one pair of records" process ends.

The result is a table of logical slot records that has been manipulated to resolve overposting issues, as illustrated by the "After" table in FIG. 10.

The process illustrated in FIGS. 12 and 13 as applied to the table shown in Table 8 from the start through the execution of the first "Yes" branch out of block 1260 is shown below:

Starting Data: 1, 2, 3, 4, 5, 5, 5, 6, 7, 8, 9,
Minimum record: 0
Number of records: 11
Minimum slot: 0
Number of slots: 13
1210 Get current Record—current index: 0, current slot: 1
1215 No
1225 No
1235 Yes
1240 Get second record to make pair—second index: 1, second slot: 2
1245 Deal with one pair of records
1305: Yes—No resolution needed
Data after pass: 1, 2, 3, 4, 5, 5, 5, 6, 7, 8, 9,
1210 Get current Record—current index: 1, current slot: 2
1215 No
1225 No
1235 Yes
1240 Get second record to make pair—second index: 2, second slot: 3
1245 Deal with one pair of records
1305: Yes—No resolution needed
Data after pass: 1, 2, 3, 4, 5, 5, 5, 6, 7, 8, 9,
1210 Get current Record—current index: 2, current slot: 3
1215 No
1225 No
1235 Yes
1240 Get second record to make pair—second index: 3, second slot: 4
1245 Deal with one pair of records
1305: Yes—No resolution needed
Data after pass: 1, 2, 3, 4, 5, 5, 5, 6, 7, 8, 9,
1210 Get current Record—current index: 3, current slot: 4
1215 No
1225 No 1235 Yes
1240 Get second record to make pair—second index: 4, second slot: 5
1245 Deal with one pair of records
1305: Yes—No resolution needed
Data after pass: 1, 2, 3, 4, 5, 5, 5, 6, 7, 8, 9,
1210 Get current Record—current index: 4, current slot: 5
1215 No
1225 No
1235 Yes
1240 Get second record to make pair—second index: 5, second slot: 5
1245 Deal with one pair of records
1305 No
1310 No
1320 No
1330 Yes
1340 Read third record—third index: 6, third slot: 5
1345 No
1355 Decrease slot index for first record in pair by 1.
Data after pass: 1, 2, 3, 4, 4, 5, 5, 6, 7, 8, 9,
1210 Get current Record—current index: 5, current slot: 5
1215 No
1225 No
1235 Yes
1240 Get second record to make pair—second index: 6, second slot: 5
1245 Deal with one pair of records
1305 No
1310 No
1320 Yes
1325 Increase slot index for second record in pair by 1.
Data after pass: 1, 2, 3, 4, 4, 5, 6, 6, 7, 8, 9,
1210 Get current Record—current index: 6, current slot: 6
1215 No
1225 No
1235 Yes
1240 Get second record to make pair 13 second index: 7, second slot: 6
1245 Deal with one pair of records
1305 No
1310 No
1320 Yes
1325 Increase slot index for second record in pair by 1.
Data after pass: 1, 2, 3, 4, 4, 5, 6, 7, 7, 8, 9,
1210 Get current Record—current index: 7, current slot: 7
1215 No
1225 No
1235 Yes
1240 Get second record to make pair—second index: 8, second slot: 7
1245 Deal with one pair of records
1305 No
1310 No
1320 Yes
1325 Increase slot index for second record in pair by 1.
Data after pass: 1, 2, 3, 4, 4, 5, 6, 7, 8, 8, 9,
1210 Get current Record—current index: 8, current slot: 8
1215 No
1225 No
1235 Yes
1240 Get second record to make pair—second index: 9, second slot: 8
1245 Deal with one pair of records
1305 No
1310 No
1320 Yes
1325 Increase slot index for second record in pair by 1.
Data after pass: 1, 2, 3, 4, 4, 5, 6, 7, 8, 9, 9,
1210 Get current Record—current index: 9, current slot: 9
1215 No
1225 No
1235 Yes
1240 Get second record to make pair—second index: 10, second slot: 9
1245 Deal with one pair of records
1305 No
1310 No
1320 Yes
1325 Increase slot index for second record in pair by 1.
Data after pass: 1, 2, 3, 4, 4, 5, 6, 7, 8, 9, 10,
1210 Get current Record—current index: 10, current slot: 10
1235: No—On the last record, do not have a pair.
Data after pass: 1, 2, 3, 4, 4, 5, 6, 7, 8, 9, 10,
The result is shown Table 9 below.

TABLE 9

| Record | Label | Slot |
|--------|-------|------|
| 0 | 0 | 1 |
| 1 | 0 | 2 |
| 2 | 1 | 3 |
| 3 | 2 | 4 |
| 4 | 3 | 4 |
| 5 | 4 | 5 |
| 6 | 4 | 6 |
| 7 | 5 | 7 |
| 8 | 6 | 8 |
| 9 | 7 | 9 |
| 10 | 8 | 10 |

Returning to FIG. 5, in one embodiment, the slot indices are translated to annotation locations (block 535). In one embodiment, this is done by determining the top and bottom depth of a slot as described above. In one embodiment, the depth of the base line for the annotation in that slot is determined by adding the height of the descender to the bottom depth for the slot. In one embodiment, the center of the slot is used. In one embodiment, an x/y coordinate for the starting point of the text is then determined from the original polyline.

Figure 14:
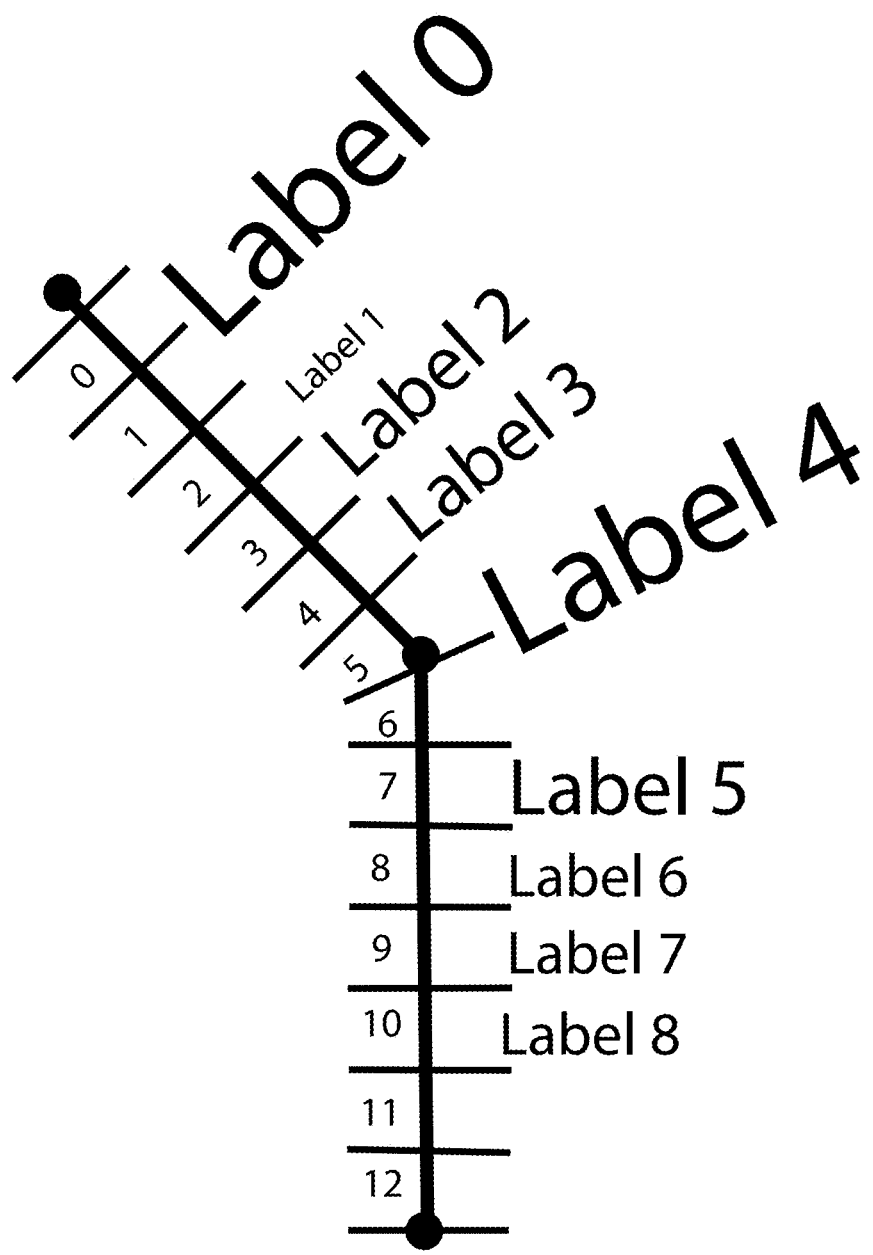
FIG. 14 shows the polyline of FIG. 2 with the annotations distributed to logical annotation slots.
Figure 15:
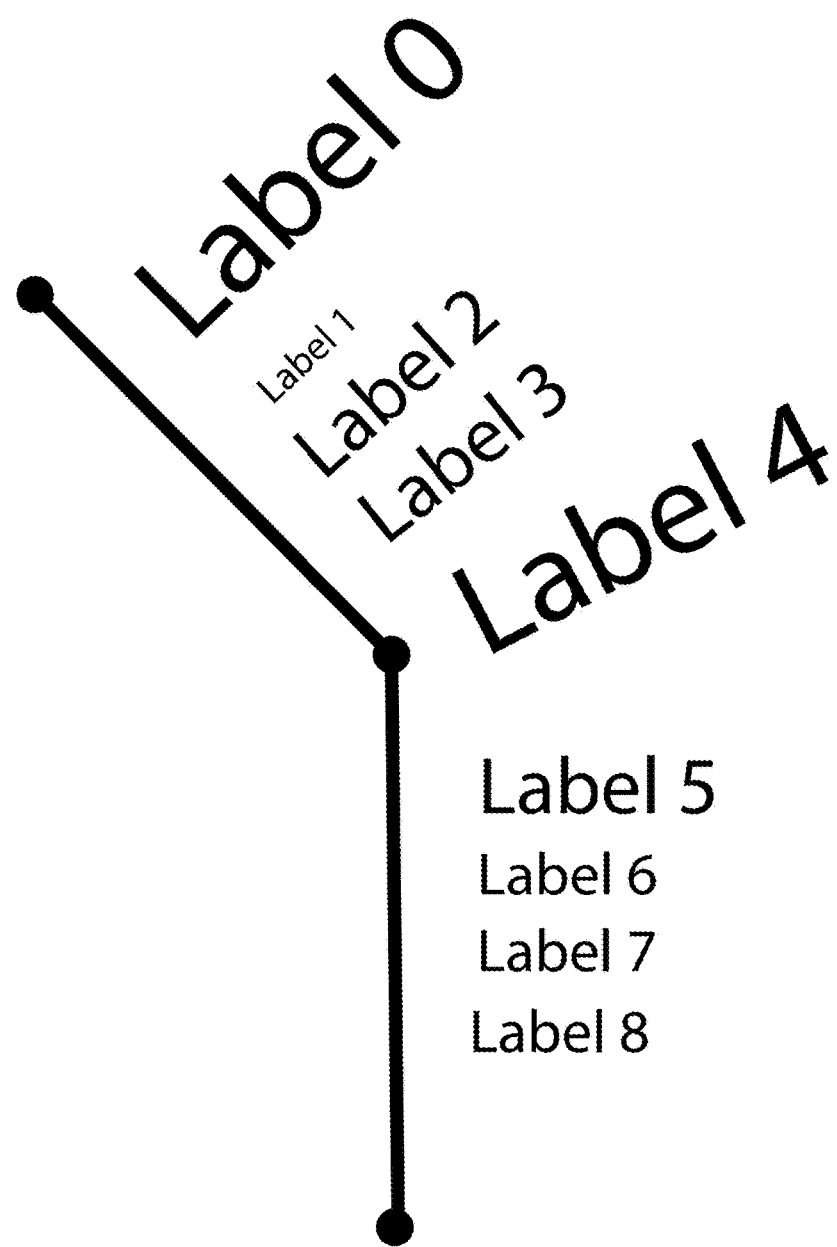
FIG. 15 shows the polyline and annotations of FIG. 14 without the logical annotation slots.

In one embodiment, the table of logical slot records is reviewed for isolated labels, i.e., labels assigned to one or more slots which have no labels assigned to adjacent slots. In one embodiment, the annotation locations for such labels are not changed. In one embodiment, the polyline and distributed annotations are then displayed on the graphical user interface 122 (block 540). An example of the annotated polyline shown in FIGS. 2-4 after the technique described above has been applied is shown in FIG. 14 with the annotation slots and in FIG. 15 without the annotation slots, which is how it would appear on the graphical user interface 122.

Another example further illustrates the processes shown in FIG. 13. Assume the process of FIGS. 12 and 13 is applied to Table 10 below:

TABLE 10

| Record | Slot |
| --- | --- |
| 0 | 12 |
| 1 | 12 |
| 2 | 7 |
| 3 | 7 |
| 4 | 9 |
| 5 | 11 |
| 6 | 11 |

As can be seen, the slot indices for record 0 and 1 are larger than the maximum value expected. Further, with respect to records 2 and 3, there is space to move record 2 toward the head, there is space to move record 3 toward the tail, the records are not at the end of the list of records, and there is a gap in the slot indices between record 3 and record 4. With respect to records 5 and 6, they are at the end of the list of records and the data is valid.

The processing of Table 10 from the start through the execution of the first "Yes" branch out of block 1260 proceeds as follows:
Starting Data: 12, 12, 7, 7, 9, 11, 11,
Minimum record: 0
Number of records: 7
Minimum slot: 0
Number of slots: 13
1210 Get current Record—current index: 0, current slot: 12
1215 No
1225 No
1235 Yes
1240 Get second record to make pair—second index: 1, second slot: 12
1245 Deal with one pair of records
1305 No
1310 Yes
1315 Decrease slot index for first record in pair by 1.
Data after pass: 11, 12, 7, 7, 9, 11, 11,
1210 Get current Record—current index: 1, current slot: 12
1215 No
1225 No
1235 Yes
1240 Get second record to make pair—second index: 2, second slot: 7
1245 Deal with one pair of records
1305 No
1310 No
1320 No
1330 Yes
1340 Read third record—third index: 3, third slot: 7
1345 No
1355 Decrease slot index for first record in pair by 1.
Data after pass: 11, 11, 7, 7, 9, 11, 11,
1210 Get current Record—current index: 2, current slot: 7
1215 No
1225 No
1235 Yes
1240 Get second record to make pair—second index: 3, second slot: 7
1245 Deal with one pair of records
1305 No
1310 No
1320 No
1330 Yes
1340 Read third record—third index: 4, third slot: 9
1345 Yes
1355 Increase slot index for second record in pair by 1.
Data after pass: 11, 11, 7, 8, 9, 11, 11,
1210 Get current Record—current index: 3, current slot: 8
1215 No
1225 No
1235 Yes
1240 Get second record to make pair—second index: 4, second slot: 9
1245 Deal with one pair of records
1305: Yes—No resolution needed
Data after pass: 11, 11, 7, 8, 9, 11, 11,
1210 Get current Record—current index: 4, current slot: 9
1215 No
1225 No
1235 Yes
1240 Get second record to make pair—second index: 5, second slot: 11
1245 Deal with one pair of records
1305: Yes—No resolution needed
Data after pass: 11, 11, 7, 8, 9, 11, 11,
1210 Get current Record—current index: 5, current slot: 11
1215 No
1225 No
1235 Yes
1240 Get second record to make pair—second index: 6, second slot: 11
1245 Deal with one pair of records
1305 No
1310 No
1320 No
1330 No
1335 Increase slot index for second record in pair by 1.
Data after pass: 11, 11, 7, 8, 9, 11, 12,
1210 Get current Record—current index: 6, current slot: 12
1235: No—On the last record, do not have a pair.
Data after pass: 11, 11, 7, 8, 9, 11, 12,
The result is shown in Table 11 below:

TABLE 11

| Record | Slot |
| --- | --- |
| 0 | 11 |
| 1 | 11 |
| 2 | 7 |
| 3 | 8 |
| 4 | 9 |
| 5 | 11 |
| 6 | 12 |

Figure 16:
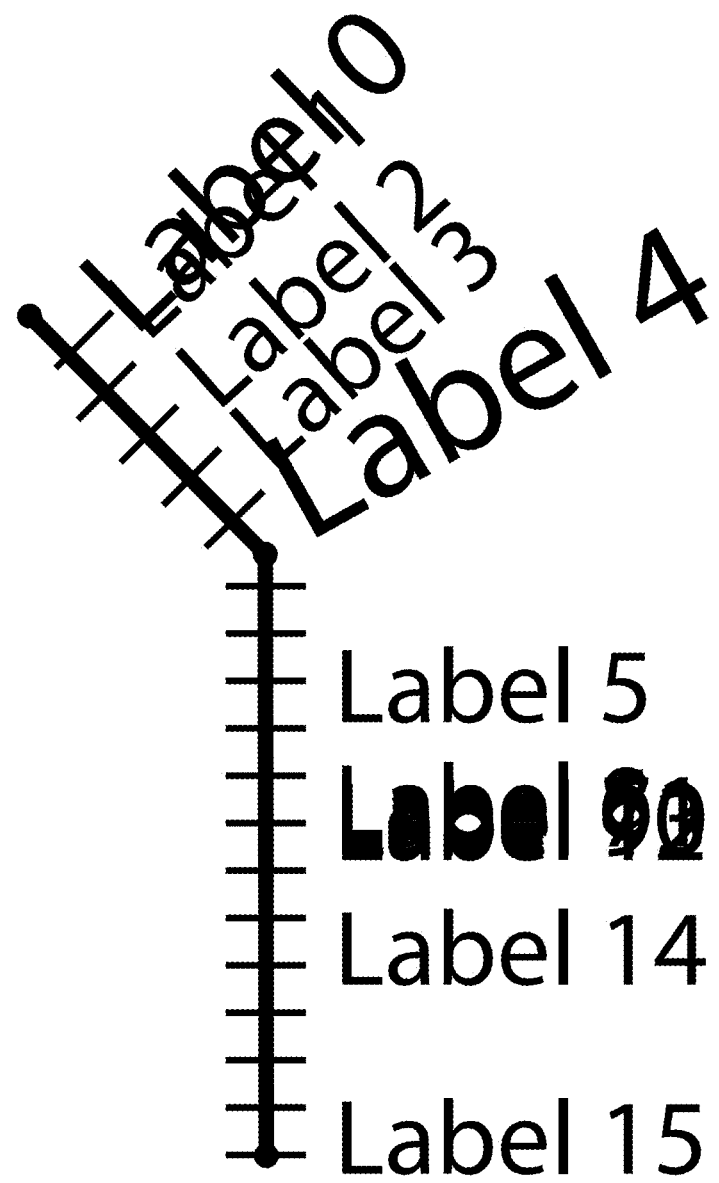
FIG. 16 shows a polyline and overposted annotations.
Figure 17:
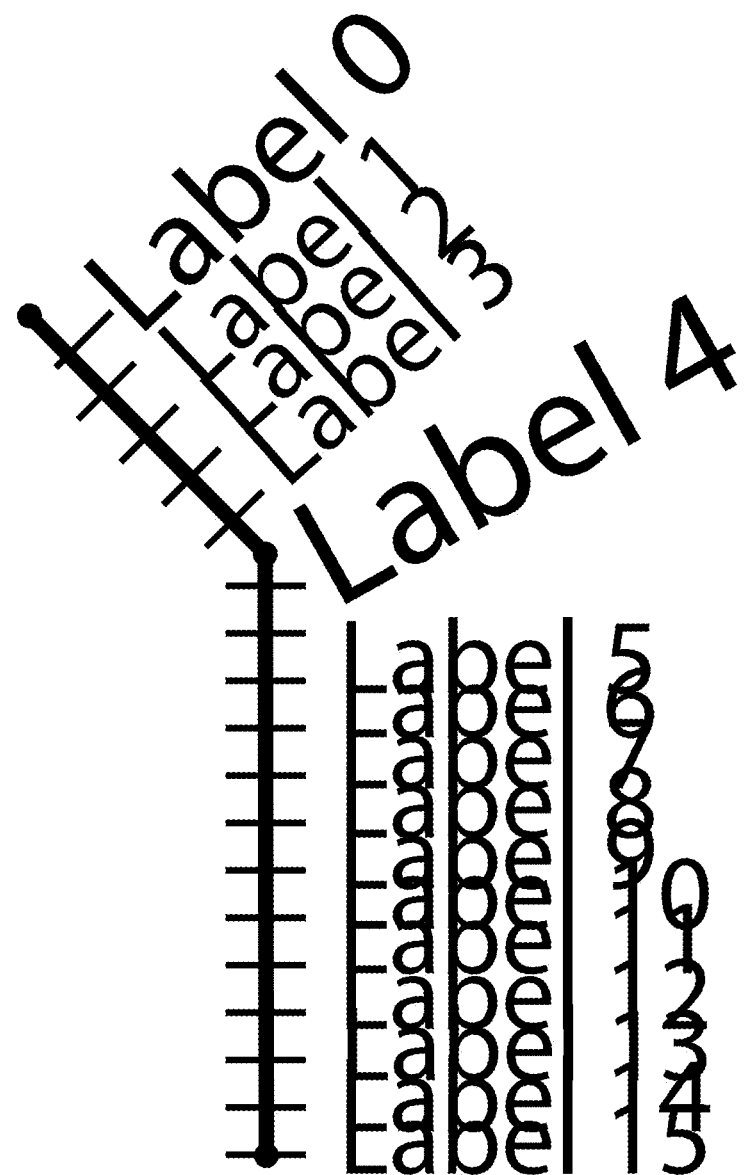
FIG. 17 shows the polyline and overposted annotations of FIG. 16 after application of the techniques described herein.

FIG. 16 illustrates a polyline and annotations before the technique described above is applied. FIG. 17 illustrates the polyline and annotations of FIG. 16 after the technique is applied. The annotations are so dense and large that, while the annotations are more easily read in FIG. 17, they still overlap.

Figure 18:
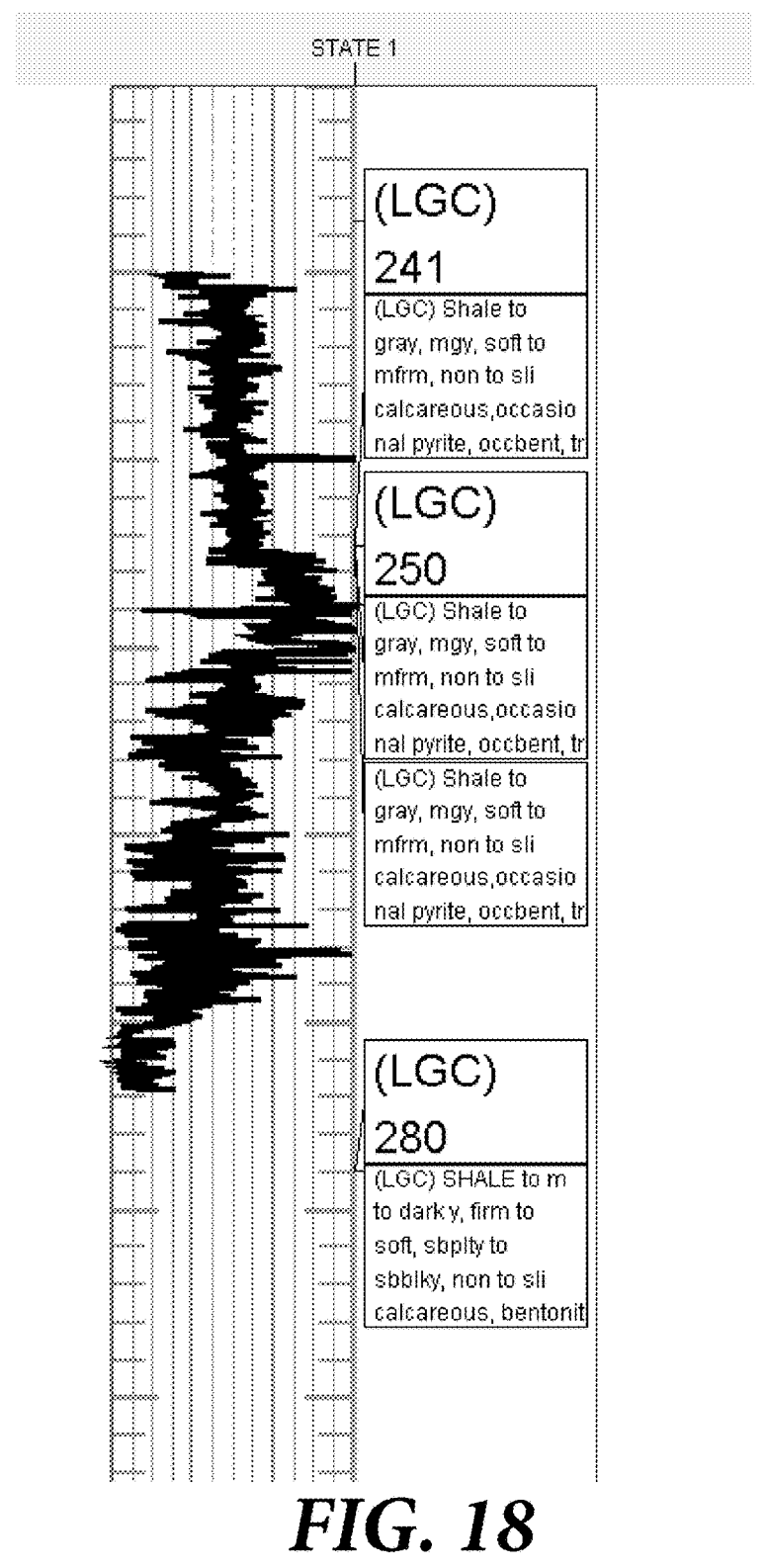
Figure 19:
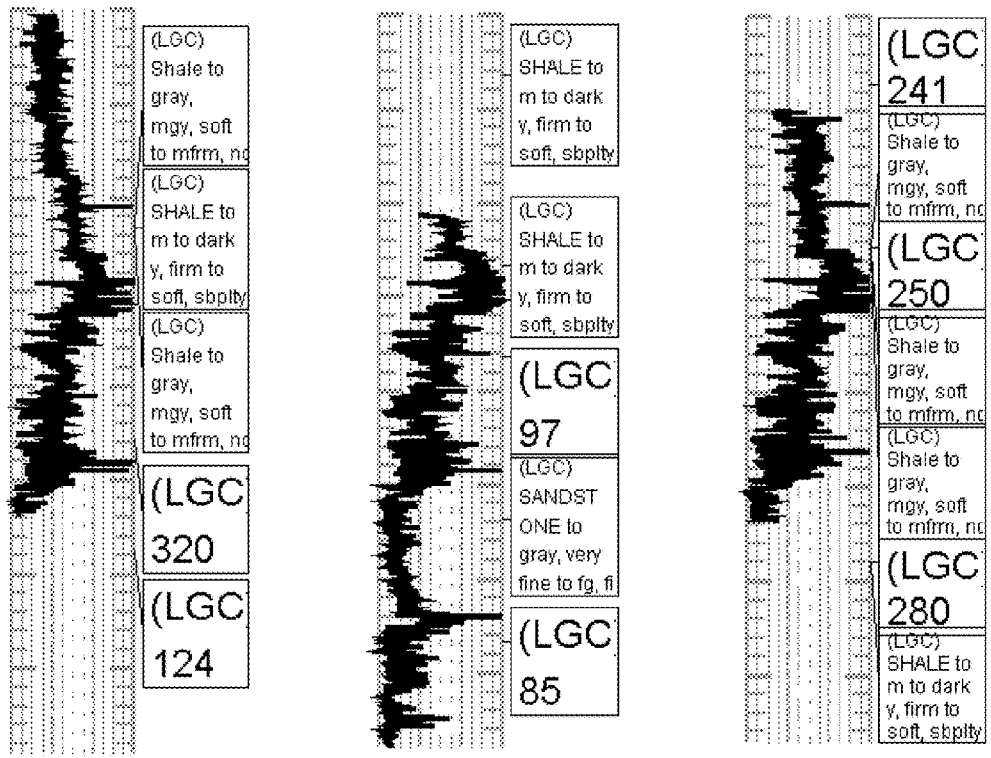

The technique described above can be applied in a variety of industries. One example is the oil industry. FIG. 18 shows a well log chart, which is analogous to the polyline 205, and annotations (e.g., "(LGC) 241", "(LGC) 250", etc.) that have been arranged along the well log chart using the technique described above. FIG. 19 shows three well log charts and associated annotations that have been arranged along the well log charts.

Another application is architectural drawings, where annotations about a structural element of a building could be arranged using this technique.

Another application is engineering drawing, where annotations about a component in a machine could be arranged using this technique.

The word "coupled" herein means a direct connection or an indirect connection.

The verb "draw" herein means to represent on the graphical user interface 122 and is not to be limited to any particular graphical technique or software.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
receiving at a processor a command to optimize the placement of a plurality of overposted annotations along a polyline displayed on a graphical user interface, wherein the plurality of annotations have a plurality of font sizes, the plurality of font sizes includes a largest of the font sizes, and each font size has a height;
selecting a plurality of annotation slot size candidates for logical annotation slots along the polyline;
choosing an annotation slot size from among the plurality of annotation slot size candidates, wherein the chosen annotation slot size is smaller than the largest of the font sizes;
dividing the polyline into logical annotation slots having the chosen annotation slot size;
distributing the plurality of overposted annotations among the logical annotation slots; and
displaying the polyline and the distributed plurality of overposted annotations on the graphical user interface.

2. The method of claim 1 wherein selecting a plurality of annotation slot size candidates comprises:
selecting as candidate slot sizes:
the heights of the font sizes of each of the plurality of annotations, and
the heights of the font sizes of each of the plurality of annotations divided by a set of integers.

3. The method of claim 1 wherein choosing an annotation slot size comprises:
calculating costs $F_j$, for $j=1 \ldots m$:

$$F_j = \frac{\sum_i s_{ij} n_i c_j - \sum_i h_i n_i}{\sum_i h_i n_i} + w \frac{\sum_i s_{ij} n_i - N}{N}$$

wherein choosing an annotation slot size further comprises choosing the annotation slot size based on cost $F_j$, where:
m is the number of annotation slot size candidates;
$F_j$ is the cost of annotation slot size candidate j;
$c_j$ is the height of annotation slot size candidate j;
i indicates each respective font size;
N is the total number of the plurality of annotations;
$n_i$ is the number of annotations in each respective font i;
$h_i$ is the height of each font i;
$s_{ij}$ is the smallest integer such that $s_{ij} c_j > h_i$; and
w is a weighting variable.

4. The method of claim 1 wherein choosing the annotation slot size further comprises:
dividing the annotation slot size candidates into two groups:
a first group in which $\Sigma_i s_{ij} n_i c_j \leq P$, and
a second group in which $\Sigma_i s_{ij} n_i c_j > P$,
where:
$c_j$ is the height of annotation slot size candidate j;
i indicates each respective font size;
$n_i$ is the number of annotations in each respective font i;
$h_i$ is the height of each font i;
$s_{ij}$ is the smallest integer such that $s_{ij} c_j > h_i$; and
P is the total length of the polyline.

5. The method of claim 4 wherein choosing the annotation slot size comprises:
determining that the first group is not empty; and
setting the annotation slot size, K, to the size of the annotation slot size candidate in the first group with the smallest cost.

6. The method of claim 4 wherein choosing the annotation slot size comprises:
determining that the first group is empty;
setting L=the height $c_r$ of the annotation slot size candidate in the second group, j=r, that has the smallest cost; and
setting the annotation slot size to $$K = L \times \frac{\sum_i s_{ir} n_i c_r}{P}.$$

7. The method of claim 1 wherein distributing the plurality of annotations among the slots comprises:
assigning one of the plurality of annotations to a plurality of adjacent logical annotation slots.

8. A method comprising:
receiving at a processor a command to optimize the placement of a plurality of overposted annotations along a polyline displayed on a graphical user interface, wherein the plurality of overposted annotations have a plurality of font sizes, the plurality of font sizes includes a largest of the font sizes, and each font size has a height;
selecting a plurality of annotation slot size candidates for logical annotation slots along the polyline;
choosing an annotation slot size from among the plurality of annotation slot size candidates;
dividing the polyline into logical annotation slots having the chosen annotation slot size;
distributing the plurality of annotations among the slots such that one of the plurality of annotations is assigned to a plurality of adjacent logical annotation slots; and
displaying the polyline and the distributed plurality of overposted annotations on the graphical user interface.

9. The method of claim 8 wherein selecting a plurality of annotation slot size candidates comprises:
selecting as candidate slot sizes:
the heights of the font sizes of each of the plurality of annotations, and
the heights of the font sizes of each of the plurality of annotations divided by a set of integers.

10. The method of claim 8 wherein choosing an annotation slot size comprises:
calculating costs $F_j$, for $j=1 \ldots m$:

$$F_j = \frac{\sum_i s_{ij} n_i c_j - \sum_i h_i n_i}{\sum_i h_i n_i} + w \frac{\sum_i s_{ij} n_i - N}{N}$$

wherein choosing an annotation slot size comprises choosing the annotation slot size based on the cost $F_j$, where:
m is the number of annotation slot size candidates;
$F_j$ is the cost of annotation slot size candidate j;
$c_j$ is the height of annotation slot size candidate j;
i indicates each respective font size;
N is the total number of the plurality of annotations;
$n_i$ is the number of annotations in each respective font i;
$h_i$ is the height of each font i;
$s_{ij}$ is the smallest integer such that $s_{ij} c_j > h_i$; and
w is a weighting variable.

11. The method of claim 8 wherein choosing the annotation slot size further comprises:
dividing the annotation slot size candidates into two groups:
a first group in which $\Sigma_i s_{ij} n_i c_j \leq P$, and
a second group in which $\Sigma_i s_{ij} n_i c_j > P$,
where:
$c_j$ is the height of annotation slot size candidate j;
i indicates each respective font size;
$n_i$ is the number of annotations in each respective font i;
$h_i$ is the height of each font i;
$s_{ij}$ is the smallest integer such that $s_{ij} c_j > h_i$; and
P is the total length of the polyline.

12. The method of claim 11 wherein choosing the annotation slot size comprises:
determining that the first group is not empty; and
setting the annotation slot size, K, to the size of the annotation slot size candidate in the first group with the smallest cost.

13. The method of claim 11 wherein choosing the annotation slot size comprises:
determining that the first group is empty;
setting L=the height $c_r$ of the annotation slot size candidate in the second group, j=r, that has the smallest cost, and
setting the annotation slot size to $$K = L \times \frac{\sum_i s_{ir} n_i c_r}{P}.$$

14. The method of claim 8 wherein the chosen annotation slot size is smaller than largest of the font sizes.

15. A computer program stored in a non-transitory computer readable storage medium, the program comprising executable instructions that cause a computer to:
receive at a processor a command to optimize the placement of a plurality of overposted annotations along a polyline displayed on a graphical user interface, wherein the plurality of overposted annotations have a plurality of font sizes, the plurality of font sizes includes a largest of the font sizes, and each font size has a height;
select a plurality of annotation slot size candidates for logical annotation slots along the polyline;
choose an annotation slot size from among the plurality of annotation slot size candidates, wherein the chosen annotation slot size is smaller than the largest of the font sizes;
divide the polyline into logical annotation slots having the chosen annotation slot size;
distribute the plurality of overposted annotations among the logical annotation slots; and
display the polyline and the distributed plurality of annotations on the graphical user interface.

16. The computer program of claim 15 wherein, when selecting a plurality of annotation slot size candidates, the computer:
selects as candidate slot sizes:
the heights of the font sizes of each of the plurality of annotations, and
the heights of the font sizes of each of the plurality of annotations divided by a set of integers.

17. The computer program of claim 15 wherein, when choosing an annotation slot size, the computer:
calculates costs $F_j$, for $j=1 \ldots m$:

$$F_j = \frac{\sum_i s_{ij} n_i c_j - \sum_i h_i n_i}{\sum_i h_i n_i} + w \frac{\sum_i s_{ij} n_i - N}{N}$$

wherein, when choosing an annotation slot size, the computer chooses the annotation slot size based on cost $F_j$,
where:
m is the number of annotation slot size candidates;
$F_j$ is the cost of annotation slot size candidate j;
$c_j$ is the height of annotation slot size candidate j;
i indicates each respective font size;
N is the total number of the plurality of annotations;
$n_i$ is the number of annotations in each respective font i;
$h_i$ is the height of each font i;
$s_{ij}$ is the smallest integer such that $s_{ij} c_j > h_i$; and
w is a weighting variable.

18. The computer program of claim 15 wherein, when choosing the annotation slot size, the computer further:
divides the annotation slot size candidates into two groups:
a first group in which $\Sigma_i s_{ij} n_i c_j \leq P$, and
a second group in which $\Sigma_i s_{ij} n_i c_j > P$,
where:
$c_j$ is the height of annotation slot size candidate j;
i indicates each respective font size;
$n_i$ is the number of annotations in each respective font i;
$h_i$ is the height of each font i;

$s_{ij}$ is the smallest integer such that $s_{ij}c_j > h_i$; and
P is the total length of the polyline.

19. The computer program of claim 18 wherein, when choosing the annotation slot size, the computer:
   determines that the first group is not empty; and
   sets the annotation slot size, K, to the size of the annotation slot size candidate in the first group with the smallest cost.

20. The computer program of claim 18 wherein, when choosing the annotation slot size, the computer:
   determines that the first group is empty;
   sets L=the height $c_r$ of the annotation slot size candidate in the second group, j=r, that has the smallest cost; and
   sets the annotation slot size to $$K = L \times \frac{\sum_i s_{ir} n_i c_r}{P}.$$

* * * * *